United States Patent
Allen et al.

(10) Patent No.: US 12,289,366 B2
(45) Date of Patent: *Apr. 29, 2025

(54) SYSTEM AND METHOD FOR REAL-TIME SECURE MULTIMEDIA STREAMING OVER A DECENTRALIZED NETWORK

(71) Applicant: Infrared5, Inc., Jamaica Plain, MA (US)

(72) Inventors: Chris Allen, Jamaica Plain, MA (US); Davide Lucchi, Boston, MA (US); Paul Gregoire, Jr., Henderson, NV (US); Todd Anderson, Middlebury, VT (US); Rajdeep Rath, Kolkata (IN); Andy Shaules, Tacoma, WA (US)

(73) Assignee: Infrared5, Inc., Jamaica Plain, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,012

(22) Filed: Aug. 8, 2022

(65) Prior Publication Data
US 2023/0069852 A1    Mar. 9, 2023

Related U.S. Application Data

(63) Continuation of application No. 17/092,947, filed on Nov. 9, 2020, now Pat. No. 11,412,037, which is a (Continued)

(51) Int. Cl.
*G06F 15/16* (2006.01)
*H04L 65/611* (2022.01)
(Continued)

(52) U.S. Cl.
CPC ........ *H04L 67/1044* (2013.01); *H04L 65/611* (2022.05); *H04L 65/65* (2022.05); *H04N 21/2187* (2013.01)

(58) Field of Classification Search
CPC ... H04L 67/1044; H04L 65/65; H04L 65/611; H04L 43/03; H04L 43/08; H04L 43/0876; H04N 21/2187; G06F 11/34
See application file for complete search history.

(56) References Cited

U.S. PATENT DOCUMENTS 6,310,873 B1    10/2001    Rainis et al.
7,809,646 B2    10/2010    Rose
(Continued)

FOREIGN PATENT DOCUMENTS

CN    1767662 A    5/2006
CN    101102310 A    1/2008
(Continued)

OTHER PUBLICATIONS

"Tether: Fiat Currencies on the Bitcoin Blockchain", https://tether.to/wp-content/uploads/2016/06/TetherWhitePaper.pdf, last accessed May 21, 2019, 20 Pages.
(Continued)

*Primary Examiner* — Yves Dalencourt
(74) *Attorney, Agent, or Firm* — Outside General Counsel LLP; Peter Gordon

(57) ABSTRACT

The present invention relates to systems and methods suitable for real-time streaming over a decentralized or centralized network. In the decentralized network, the present invention relates to a system and method that utilizes a block-chain distributed network to securely and reliably stream multimedia in real-time. In the centralized network, the present invention utilizes a centralized stream manager to manage nodes within the distributed network to securely and reliably stream multimedia in real-time.

29 Claims, 19 Drawing Sheets

Related U.S. Application Data continuation of application No. 15/954,473, filed on Apr. 16, 2018, now Pat. No. 10,848,553.

(51) Int. Cl.
    *H04L 65/65*         (2022.01)
    *H04L 67/104*       (2022.01)
    *H04N 21/2187*     (2011.01)

(56) References Cited

U.S. PATENT DOCUMENTS

| | | | |
|---|---|---|---|
| 7,937,362 | B1 | 5/2011 | Lian et al. |
| 8,699,336 | B2 | 4/2014 | Huo |
| 8,797,867 | B1 | 8/2014 | Chen et al. |
| 10,848,553 | B2* | 11/2020 | Allen ............... H04N 21/44209 |
| 10,979,476 | B2 | 4/2021 | Allen et al. |
| 11,064,004 | B2 | 7/2021 | Allen et al. |
| 11,412,037 | B2* | 8/2022 | Allen ............... H04N 21/2408 |
| 11,503,096 | B2 | 11/2022 | Allen et al. |
| 2002/0059117 | A1 | 5/2002 | Yoch et al. |
| 2008/0065771 | A1 | 3/2008 | Marvit et al. |
| 2008/0082507 | A1 | 4/2008 | Tarantino et al. |
| 2008/0133767 | A1 | 6/2008 | Birrer et al. |
| 2011/0087915 | A1 | 4/2011 | Zhang et al. |
| 2013/0191518 | A1 | 7/2013 | Narayanan et al. |
| 2013/0322242 | A1* | 12/2013 | Swenson ............... H04L 47/12 370/252 |
| 2014/0098850 | A1* | 4/2014 | Wolfram ............ H04N 21/8352 375/E7.154 |
| 2014/0198838 | A1 | 7/2014 | Andrysco et al. |
| 2015/0002619 | A1* | 1/2015 | Johnston ............ H04L 65/1069 348/14.12 |
| 2015/0058153 | A1 | 2/2015 | Tazian |
| 2015/0082021 | A1 | 3/2015 | Mandyam et al. |
| 2015/0095646 | A1 | 4/2015 | Nair et al. |
| 2015/0170112 | A1 | 6/2015 | Decastro |
| 2015/0235282 | A1 | 8/2015 | Kamath |
| 2016/0065636 | A1 | 3/2016 | Cheung et al. |
| 2016/0094649 | A1* | 3/2016 | Dornquast ............ H04L 67/535 709/227 |
| 2016/0094659 | A1 | 3/2016 | Shimomoto |
| 2016/0269365 | A1* | 9/2016 | Reddy ............... H04L 9/0822 |
| 2017/0103468 | A1 | 4/2017 | Orsini et al. |
| 2017/0206523 | A1* | 7/2017 | Goeringer ............... G06F 21/45 |
| 2017/0277909 | A1* | 9/2017 | Kraemer ............... G06F 21/10 |
| 2017/0279774 | A1 | 9/2017 | Booz et al. |
| 2018/0211043 | A1 | 7/2018 | Husain |
| 2018/0248880 | A1 | 8/2018 | Sardesai et al. |
| 2018/0268382 | A1 | 9/2018 | Wasserman |
| 2019/0089760 | A1* | 3/2019 | Zhang ..................... H04L 65/70 |
| 2019/0296915 | A1 | 9/2019 | Lancashire |
| 2019/0320004 | A1 | 10/2019 | Allen et al. |
| 2019/0320006 | A1 | 10/2019 | Allen et al. |
| 2019/0320014 | A1 | 10/2019 | Allen et al. |
| 2021/0058456 | A1 | 2/2021 | Chris et al. |
| 2021/0360049 | A1 | 11/2021 | Allen et al. |
| 2023/0164207 | A1 | 5/2023 | Allen et al. |

FOREIGN PATENT DOCUMENTS

| | | |
|---|---|---|
| CN | 101176087 A | 5/2008 |
| CN | 106210756 A | 12/2016 |
| CN | 107277781 A | 10/2017 |
| CN | 112292681 A | 1/2021 |
| CN | 112470156 A | 3/2021 |
| EP | 3 264 722 A1 | 1/2018 |
| EP | 3 782 068 A1 | 2/2021 |
| EP | 3 782 069 A1 | 2/2021 |
| GB | 201802347 | 3/2018 |
| IN | 202211076654 | 1/2023 |
| WO | 2019/204158 A1 | 10/2019 |
| WO | 2019/204159 A1 | 10/2019 |

OTHER PUBLICATIONS

Al-Naji, et al., "Basis: A Price-Stable Cryptocurrency with an Algorithmic Central Bank", Version 0.99.7, URL: www.basis.io, Jun. 20, 2017, 27 Pages.

Amazon Web Services, Inc., "Amazon Web Services—Simple Monthly Calculator", hllps://calculator.s3.amazonaws.com/index.html, last accessed May 21, 2019, 24 Pages.

Andreasson, et al., "Rymd Distributed Encrypted Peer-To-Peer Storage Bachelor's thesis in Computer Science", Bachelor's thesis in Computer Science, URL: https://odr.chalmers.se/bitstream/20.500.12380/203144/1/203144.pdf, Jan. 1, 2014, 63 Pages.

Bordo, et al., "Central Bank Digital Currency and the Future of Monetary Policy", Retrieved from the Internet on Feb. 10, 2020, Aug. 31, 2017, pp. 1-32.

Brent, et al., "Reserve Stabilization Protocol", URL: https://uploads-ssl.webflow.com/5c0649fb67dd7b3627d59953/5c092732e4eab1547fa9bd0c_whitepaper.pdf., Nov. 30, 2018, 29 Pages.

Brooks, et al., "Havven, A Decentralized Payment Network and Stablecoin v0.8", Jun. 11, 2018, 31 Pages.

Doran, et al., "Emergent Economies for Pole Playing Games", Technical Report LARC-2010-03, Laboratory for Recreational Computing Department Science & Engineering University of North Texas, Jun. 23, 2010, 24 Pages.

Dorri, et al., "LSB: A Lightweight Scalable BlockChain for IoT Security and Privacy", Dec. 8, 2017, 17 Pages.

European Patent Office, "Communication under Rule 71(3) Received", European Application No. 19789015.5, dated Jan. 3, 2023., 37 Pages.

European Patent Office, "Communication under Rule 71(3) Received", European Application No. 19789015.5, dated Jun. 21, 2023, 38 Pages.

European Patent Office, "Extended European Search Report", European Application No. 19789015.5, dated Aug. 16, 2021, 13 Pages.

European Patent Office, "Extended European Search Report Received", European Application No. 19788671.6, dated Mar. 3, 2022, 16 Pages.

Github, Inc., "https://github.com/larsiusprime/bazaarBot", last accessed May 21, 2019.

Lipton, et al., "Digital trade coin: towards a more stable digital currency", URL: https://royalsocietypublishing.org/doi/pdf/10.1098/rsos.180155, Jun. 18, 2018, 15 Pages.

Silva, et al., "Cryptocurrency Compensation: A Primer on Token-Based Awards", Harvard Law School Forum on Corporate Governance, May 19, 2018, pp. 1-6.

U.S. Patent and Trademark Office, "Final Office Action Received", U.S. Appl. No. 17/347,022, dated Apr. 5, 2022, 8 Pages.

U.S. Patent and Trademark Office, "Final Office Action Received", U.S. Appl. No. 15/954,318, dated Feb. 13, 2019, 8 Pages.

U.S. Patent and Trademark Office, "Final Office Action Received", U.S. Appl. No. 15/954,318, dated Nov. 1, 2019, 15 Pages.

U.S. Patent and Trademark Office, "Final Office Action Received", U.S. Appl. No. 16/161,264, dated Nov. 19, 2019, 10 Pages.

U.S. Patent and Trademark Office, "International Search Report and Written Opinion Received", International Application No. PCT/US2019/027304, dated Aug. 15, 2019, 14 Pages.

U.S. Patent and Trademark Office, "International Search Report and Written Opinion Received", International Application No. PCT/US2019/027300, dated Aug. 26, 2019, 13 Pages.

U.S. Patent and Trademark Office, "International Search Report and Written Opinion Received", International Application No. PCT/US2019/067767, dated Mar. 2, 2020, 13 pages.

U.S. Patent and Trademark Office, "Non Final Office Action Received", U.S. Appl. No. 16/161,264, dated Aug. 9, 2019, 8 Pages.

U.S. Patent and Trademark Office, "Non Final Office Action Received", U.S. Appl. No. 15/954,318, dated Jun. 2, 2020, 8 Pages.

U.S. Patent and Trademark Office, "Non Final Office Action Received", U.S. Appl. No. 15/954,318, dated Jun. 14, 2019, 7 Pages.

U.S. Patent and Trademark Office, "Non Final Office Action Received", U.S. Appl. No. 15/954,318, dated Oct. 23, 2018, 7 Pages.

U.S. Patent and Trademark Office, "Non Final Office Action Received", U.S. Appl. No. 16/161,264, dated Sep. 21, 2020, 11 Pages.

(56) References Cited

OTHER PUBLICATIONS

U.S. Patent and Trademark Office, "Non-Final Office Action Received", U.S. Appl. No. 17/347,022, 21 Pages.
U.S. Patent and Trademark Office, "Non-Final Office Action Received", U.S. Appl. No. 17/092,947, 31 Pages.
U.S. Patent and Trademark Office, "Non-Final Office Action Received", U.S. Appl. No. 18/053,386, dated Mar. 10, 2023, 10 Pages.
U.S. Patent and Trademark Office, "Notice of Allowance Received", U.S. Appl. No. 17/092,947, dated Apr. 13, 2022, 8 Pages.
U.S. Patent and Trademark Office, "Notice of Allowance Received", U.S. Appl. No. 17/347,022, dated Jul. 19, 2022, 6 Pages.
U.S. Patent and Trademark Office, "Notice of Allowance Received", U.S. Appl. No. 15/954,318, dated Dec. 11, 2020, pp. 5.
U.S. Patent and Trademark Office, "Notice of Allowance Received", U.S. Appl. No. 15/954,473, dated Jul. 24, 2020, 7 Pages.
U.S. Patent and Trademark Office, "Notice of Allowance Received", U.S. Appl. No. 16/161,264, dated Mar. 15, 2021, 5 Pages.
WIPO, "International Preliminary Report on Patentability", International Application No. PCT/US2019/027300, dated Oct. 29, 2020, 10 Pages.
WIPO, "International Preliminary Report on Patentability", International Application No. PCT/US2019/027304, dated Oct. 29, 2020, 11 Pages.
Devadutta Ghat, "VideoCoin—A Decentralized Video Encoding, Storage, and Content Distribution Network", XP05567902, Retrieved from the Internet by EPO: URL:https://storage.googleapis.com/videocoin-proico/VideoCoin-Whitepaper.pdf, dated Nov. 7, 2017, 21 Pages.
European Patent Office, "Communication Pursuant to Article 94(3) EPC", European Application No. 19788671.6, Jan. 31, 2024, 7 Pages.
Chinese Patent Office, "First Office Action Received", Chinese Patent Application No. 201980040073.4, Aug. 30, 2024, 16 Pages.
Chinese Patent Office, "First Office Action Received", Chinese Patent Application No. 201980038724.6, Sep. 2, 2024, 24 Pages.
Wang, M, et al., "Network Coding in Live Peer-to-Peer Streaming", IEEE Transactions on Multimedia, vol. 9, Issue 8, Dec. 31, 2007, 15 Pages.
Li, Weixian, "Design And Implementation Of Digital Currency Distributed Ledger Consenus System", China's Outstanding Master's Degree Thesis Full-text Database Information Technology Series, vol. 2017, Issue 2, Feb. 15, 2017, 83 Pages.
Chen Ye, et al., "Telecommunications Science, 03", Blockchain-based network Overview of CyberSecurity Technology, Mar. 20, 2018.

\* cited by examiner

SYSTEM AND METHOD FOR REAL-TIME SECURE MULTIMEDIA STREAMING OVER A DECENTRALIZED NETWORK

FIELD OF THE INVENTION

The present invention relates to systems and methods suitable for real-time streaming over a decentralized or centralized network. In particular, the present invention relates to a system and method that utilizes a block-chain or central stream manager to securely and reliably stream multimedia in real-time over a distributed network.

BACKGROUND

Generally, the advent of the Internet and increased access to computer networks providing increased network bandwidth has facilitated the ability to stream audio and video content to end users. Live video streaming is a fast-growing market. In 2016, 81% of internet and mobile audiences watched more live videos than in 2015. Video streaming accounts for over two-thirds for all internet traffic, and it is expected to become 82% by 2020. Live streaming offers opportunities for content that traditionally required people to attend a physical event. Currently 45% of live video audiences would pay for live, exclusive, on-demand video from a favorite team, speaker, or performer. Video quality is considered the most important factor for 67% of the viewers, and that implies high resolution video streams with low latency.

Live video streaming creates much greater engagement, viewers will spend eight times longer watching live video than on-demand-video. This translates 42.8 minutes for live video versus only 5.1 minutes for on-demand.

The live streaming market is estimated to grow from USD 30.29 Billion in 2016 to USD 70.05 Billion by 2021, with an expected CAGR (Compound Annual Growth Rate) of 18.3% over the next 5 years. Platforms such as Facebook Live have seen viewing time grow by four times over 2016, and live video comprises 20% of their video content. Newcomers such as HQ Trivia have seen even faster growth over a six-month period.

From January 2016 to June 2016 the top 500 media publishers that streamed live video on their websites and social media platforms increased from 10% to 50%. 53% of U.S. internet users aged 13-17 watch live streaming videos on social media as of November 2016. In China, the numbers are even higher with 83% of millennials and nearly half of their total online population using live streaming services.

Fueled by consumer demand for live interactive video experiences, more and more companies are learning just how expensive it is to run these streams. By far the greatest expense in low latency video streaming is bandwidth. Conventional cloud based services provide solutions that are easy to use and scale as the demand rises, but those services can be expensive when pricing per gigabit.

SUMMARY

There is a need for improvements for securely and reliably streaming multimedia. The present invention provides, in various embodiments solutions to address this need, in addition to having other desirable characteristics.

In accordance with example embodiments of the present invention, a system for creating a decentralized network for real-time streaming is provided. The system includes at least one broadcaster device configured to provide a stream to at least one subscriber device, at least one origin node device configured to establish a connection with the at least one broadcaster device for forwarding the stream, and at least one edge node device. The at least one edge node device is configured to establish a connection with the at least one subscriber device, receive the stream from the at least one origin device, and provide the stream to the at least one subscriber device. The providing the stream from the at least one broadcaster device to the at least one subscriber device is controlled by blockchain.

In accordance with aspects of the present invention, the system further includes at least one relay node device configured to relay the stream between the at least one origin node device and the at least one edge node device. The system can further include identifying suitable node devices for at least one of the at least one origin node device, the at least one edge node device, and the at least one relay node device from a list of available node devices using a logistical regression process. The logistical regression process can include determining at least one of a geographical position, a bandwidth score, a packet loss score, and an age and identifying the suitable nodes based on the least one of the geographical position, the bandwidth score, the packet loss score, and the age. The determining the geographical position can include calculating a geographical position of a node based on the IP address of the node at a time of joining the decentralized network, associating a geographical value based on a geographical region of the geographical position, and calculating a distance between the node and a target node based on the geographical value of the node and a geographical value of the target node. The determining the bandwidth score can include monitoring bandwidth of transactions provided to a node, calculating a sum of all the bandwidth of the transactions, and dividing the sum by a sum of all transactions generates after the node joined the decentralized network. The determining the packet loss score can include calculating a sum of all packet losses reported by neighbor nodes for a node and dividing the sum by a total number of transactions performed by the node. The determining the age can include an amount of time that has elapsed since a most recent stream was delivered by a node.

In accordance with aspects of the present invention, the system can further include at least one proxy node device configured to establish communications between the at least one origin node device and the at least one broadcaster for use in a WebRTC protocol. The WebRTC protocol can be utilized to implement a double layer encryption comprising a first layer of encryption through the WebRTC protocol using Datagram Transport Layer Security (DTLS) and a second layer of encryption transmitting a Digital Rights Management (DRM) key through a data channel of WebRTC. The system can further include a transcoder configured to provide a Multiple Bitrate (MBR) to create multiple streams with different bitrates through the at least one origin node.

In accordance with example embodiments of the present invention, method for a node electing to participate in real-time streaming over a decentralized network is provided. The method includes registering, by the node, to participate within the decentralized network, deploying, by the decentralized network, a smart contract to the registered node, issuing a call, by the node, to the smart contract to join the decentralized network, receiving an election, by the node, for a role in streaming multimedia over the decentralized network, streaming, by the node, received multimedia to a target node, monitoring, by the node, computational resources of the node, and updating a data field, by the node, for a status of the node based at least on the monitored computational resources.

In accordance with example embodiments of the present invention, method for establishing a connection for streaming over a decentralized network is provided. The method includes obtaining, by an end user device, a list of available nodes from a blockchain, identifying, by the end user device, suitable nodes from the list of available nodes using logistical regression, selecting, by the end user device, at least one node from the suitable nodes using a verifiable random function, identifying, by the end user device, suitable proxy nodes from the list of available nodes using logistical regression, and selecting, by the end user device, at least one proxy node from the suitable proxy nodes using the verifiable random function. The method also includes connecting, by the end user device, to the at least one proxy node, connecting, by the at least one proxy node, to the at least one node, and updating a blockchain to reflect relationships between the end user device and the at least one proxy node and between the at least one proxy node and the at least one node. The at least one proxy node establishes a connection between the end user device and the at least one node.

In accordance with aspects of the present invention, the at least one node is one of an edge node and an origin node. The end user device can be one of a broadcaster device and a subscriber device. The method can further include selecting, by the end user device, a backup node for the at least one node from the suitable nodes using a verifiable random function. The connection can be a WebRTC connection.

In accordance with example embodiments of the present invention, a system for creating a centralized network for real-time streaming is provided. The system includes at least one broadcaster device configured to provide a stream to at least one subscriber device, at least one origin node configured to establish a connection with the at least one broadcaster device for forwarding the stream, and at least one edge node device. The at least one edge node device is configured to establish a connection with the at least one subscriber device, receive the stream from the at least one origin device, and provide the stream to the at least one subscriber device. Providing the stream from the at least one broadcaster device to the at least one subscriber device is controlled by a centralized stream manager configured to elect the at least one origin node and the at least one edge node from a list of available nodes.

In accordance with aspects of the present invention, the system further including at least one relay node device configured to relay the stream between the at least one origin node device and the at least one edge node device. The stream manager can elect the at least one origin node and the at least one edge node from a list of available nodes based on geographic location of the at least one broadcaster device and the at least one subscriber device.

In accordance with example embodiments of the present invention, a method for establishing a connection for streaming over a centralized network is provided. The method includes receiving, by a stream manager device, a request for an origin node or an edge node from an end user device, identifying, by the stream manager device, suitable nodes for the requesting end user device from a list of available nodes, selecting, by the stream manager device, at least one node from the suitable nodes, and transmitting, by the stream manager device, the at least one node to the requesting end user device.

In accordance with aspects of the present invention, the end user device is a broadcaster device or a subscriber device.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
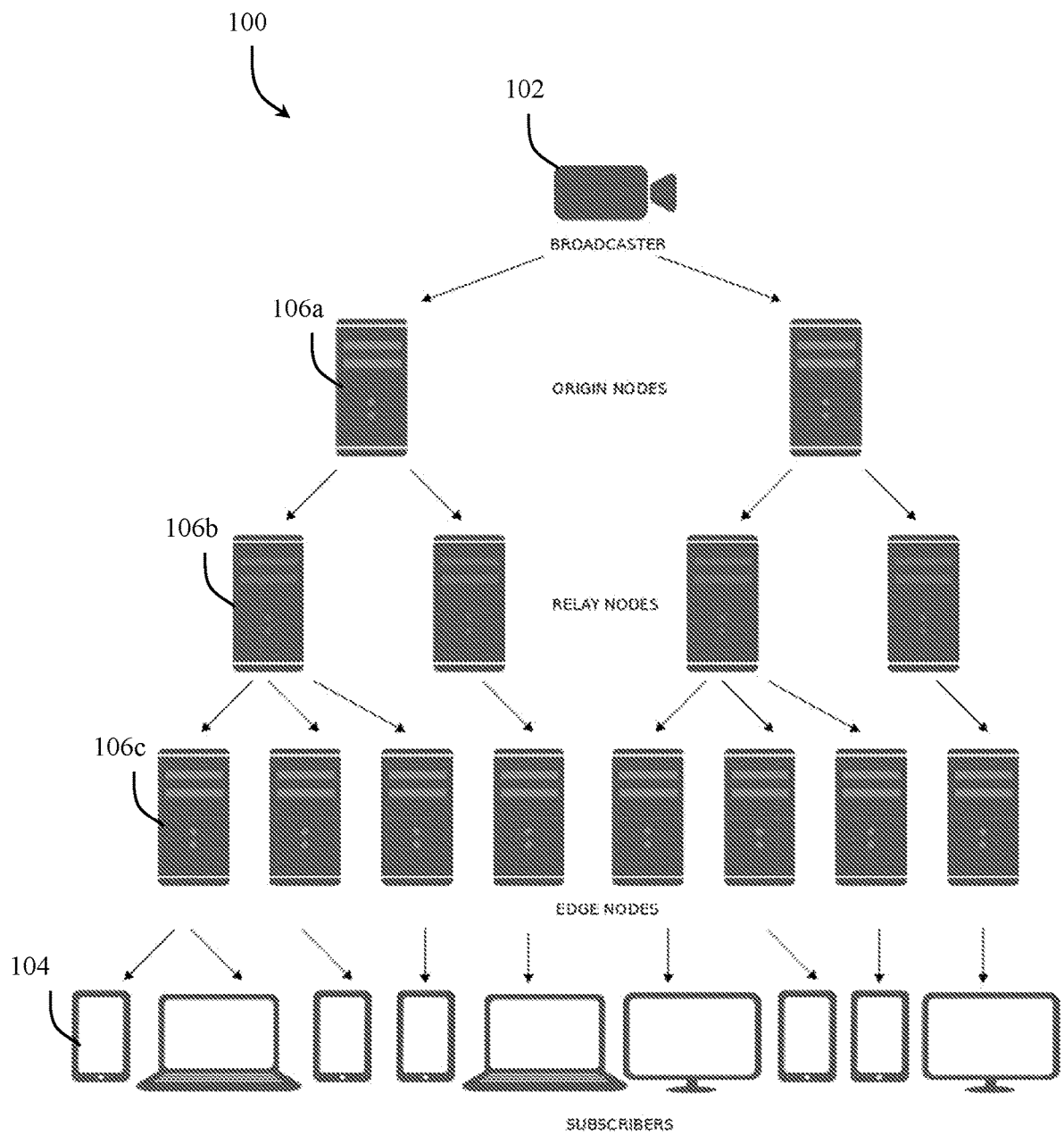
FIG. 1 is an exemplary configuration for a decentralized streaming network, in accordance with the present invention.

An illustrative embodiment of the present invention relates to methods and systems for providing multimedia over the Internet. The present invention can be implemented within a decentralized system for real-time multimedia streaming based on blockchain technology or a centralized system with a centralized stream manager. The decentralized system of the present invention exploits available resources provided by individual users/computing devices, also referred to as node owners, to deliver the streams through a decentralized network. Regardless of the implementation (e.g., decentralized or centralized), the present invention is configured to exploit cloud and/or bare metal hardware resources that are available in excess to deliver multimedia content to end users. More specifically, individual users who chose to run the software enabling the present invention, become one of the nodes in the peer-to-peer network and can start routing streams between a broadcaster and a subscriber. As a result, the present invention leverages advancements in computing technology (e.g., Internet, cloud computing, blockchain, etc.) to implement a unique combination of steps that, in combination, provides improved systems and method for streaming multimedia between remotely located devices.

As used herein, a broadcaster is defined as any user and user device that wants to stream multimedia through the network and a subscriber is any user and user device that wants to watch a stream. As would be appreciated by one skilled in the art, reference to the broadcaster and the subscriber as discussed in relation to the present invention can include both the computing device implementing the processes of the present invention and the user(s) who owns and/or operates the computing device. The present invention provides benefits to broadcasters providing streams, nodes hosting the streams, and subscribing end users receiving the stream.

Additionally, broadcasters will be in total control of their streams and no entity in the system has the power to apply any censorship measure. In certain implementations, streams can be delivered encrypted through the decentralized network and a DRM (Digital Rights Management) key is implemented to guarantee that only viewers with permission to do so can decrypt the content. In the decentralized system, all the operations can be controlled by the underlying blockchain technology used to provide real-time streaming with end to end latency under 500 ms. In the centralized system, all the operations can be controlled by a centralized stream manager. Additionally, to ensure the best performance, the systems elect nodes based on bandwidth and geographical position for delivering a particular stream.

FIGS. 1 through 13, wherein like parts are designated by like reference numerals throughout, illustrate an example embodiment or embodiments of improved operation for streaming audio and video over the Internet, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts an exemplary system and network for implementing the present invention. In particular, FIG. 1 depicts a distributed peer-to-peer network 100 configured to stream multimedia (e.g., audio or video) from a broadcaster 102 (e.g., service provider) to end users 104 (e.g., subscribers) over a series of connected nodes 106. Each of the components within the network 100 operate in accordance with the present invention based on the software installed therein (e.g., server/client software). In implementation, the behavior of each node 106 within the network 100 is managed by the process and protocol implemented by the software of the present invention. In accordance with an example embodiment, the nodes 106 can be assigned one of four different roles within the network 100. The assignment of the roles is dictated by the type of network. For example, in a decentralized network 100, the roles are dictated by the blockchain and in the centralized network, the roles are assigned by a centralized stream manager. The roles include origin nodes 106a, relay nodes 106b, edge nodes 106c, and optional proxy nodes 106d. The origin nodes 106a are the ingest nodes 106 and can be configured to receive the multimedia stream from a broadcaster 104 and distribute it to the relay nodes 106b/edge nodes 106c. In implementation, the origin nodes 106a may be nodes 106 owned and controlled by the broadcaster 102 or nodes 106 chosen randomly from a pool of nodes 106 available in the peer-to-peer network 100.

The relay nodes 106b can be configured to forward the multimedia stream between origin nodes 106a and edge nodes 106c. In implementation, each relay node 106b may be connected to tens or hundreds of edge nodes 106c. The edge nodes 106c are the nodes 106 that can be configured to deliver the multimedia stream to the end users 104. Each of the edge nodes 106c can serve up to a few thousand subscribers 104. As would be appreciated by one skilled in the art, this number depends on the hardware capabilities of the nodes 106 in the network 100 and the quality of the streams provided by the broadcaster 102. In general, the higher the quality of the streams, then the less capacity per node 106.

Figure 2:
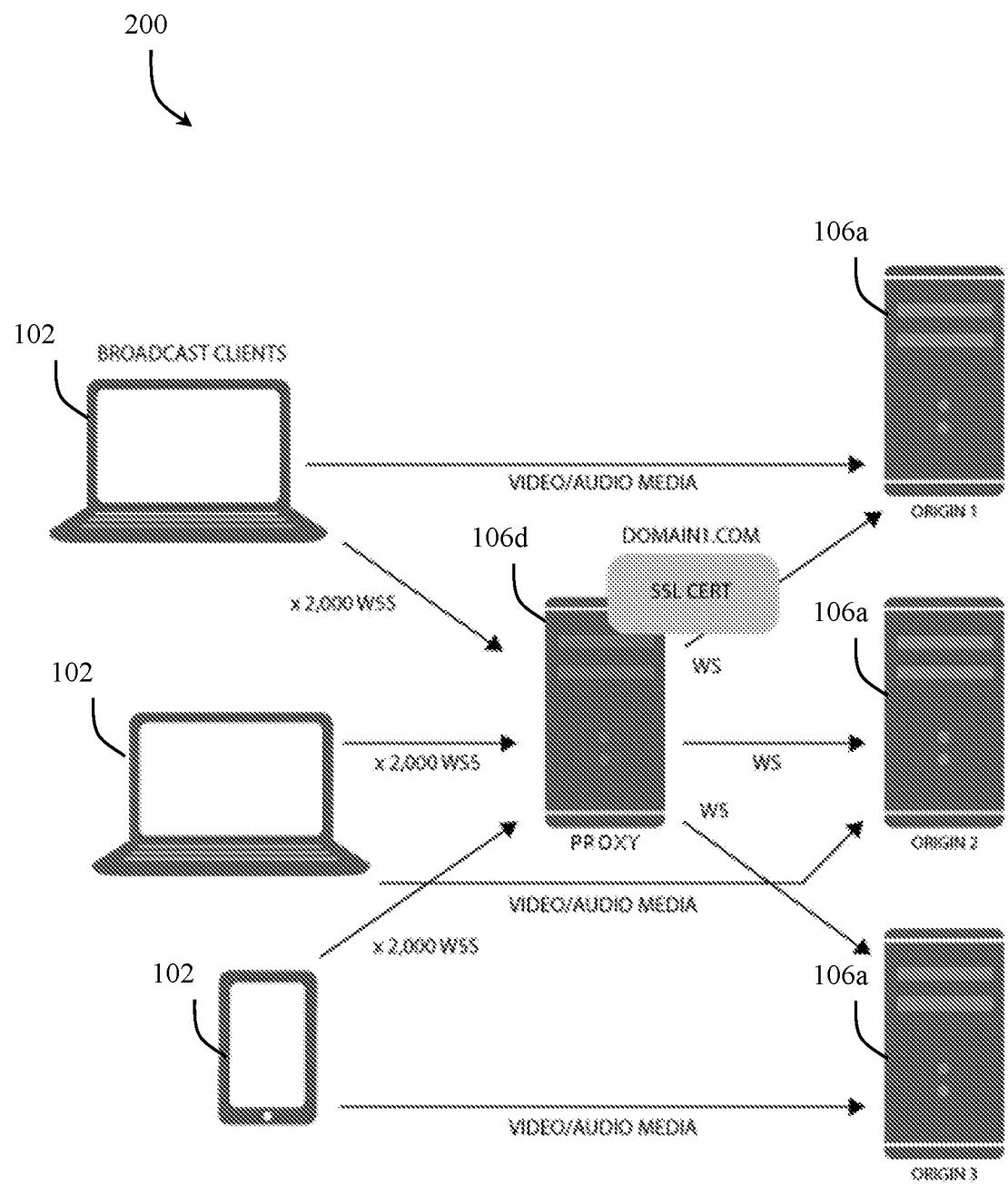
FIG. 2 is exemplary configuration for implementing a proxy node within a decentralized streaming network, in accordance with the present invention.

In accordance with an example embodiment of the present invention, proxy nodes 106d can be optionally required depending on the communication protocol being implemented over the network 100. For example, Web Real-Time Communication (WebRTC) and the HTML5 Cross-Origin Resource Sharing (CORS) standards mandate that Hypertext Markup Language (HTML) pages be delivered via Hypertext Transfer Protocol Secure (HTTPS) to the browser for the user to access the camera and microphone, and thus require implementation of a proxy (e.g., proxy node 106d) to pass a Secure Sockets Layer (SSL) certificate, as depicted in FIG. 2. As would be appreciated by one skilled in the art, other protocols that do not require an SSL certificate (e.g., Real-Time Messaging Protocol (RTMP), Secure Real-Time Transport Protocol (SRTP), HTTP Live Streaming (HLS), etc.) do not need a proxy node 106c to operate.

The proxy nodes 106d are typically configured as entry points for broadcasters 102 and subscriber 104 (e.g., between a subscriber 104 and edge node 106c and/or a broadcaster 102 and an origin node 106a). In particular, the proxy nodes 106d can be nodes 106 that are configured to implement a cryptographic protocol to provide communication security over the network and can be elected randomly among the nodes 106 in the network 100. The only requirement for the proxy nodes 106d is to implement an SSL certificate and have a domain name The SSL certificate will allow the setup a real-time communication (e.g., via WebRTC connections) and compliance with rules enforced by web browsers (e.g., Cross-Origin Resource Sharing (CORS)). Additionally, SSL is required only for the signaling phase in WebRTC, which can be done over HTTPS or Secure WebSockets (WSS). Once the signaling is completed the proxy node 106c is no longer required and the browser (e.g., on the broadcaster 102 device) can connect directly with another node 106 (e.g., origin node 106a). FIG. 2 depicts how a proxy node 106d is used to set up a connection between broadcasters 102 and origin nodes 106a. As depicted in process 200 of FIG. 2, for example, the broadcasters 102 will connect to a proxy node 106d directly using WSS and the broadcasters will share the IP address of the origin node 106a with the proxy node 106d. Thereafter, the proxy node 106d can connect directly with the origin nodes 106a using WSS. Once that process is complete, the broadcasters 102 can connect directly with the respective origin nodes 106a, as depicted in FIG. 2.

Each node 106 in the peer-to-peer network 100 may have a different role for different multimedia streams (different instances of streams). For example, a node 106 can be configured as an origin node 106a for one stream while concurrently being configured as an edge node 106c for another stream. As would be appreciated by one skilled in the art, each of the nodes 106 can be restricted or enabled from particular roles according to the design of the protocols within the network and preferences of a network administrator.

In accordance with an example embodiment, the network 100 is implemented as a blockchain distributed computing system. Blockchain is used to publish data that should be available to all nodes 106 participating in the peer-to-peer network 100. For example, information about the past and upcoming multimedia streams can be shared across all of the nodes 106 in the network 101. Information for all of the nodes can also be shared over the blockchain for managing connections for a multimedia stream. As would be appreciated by one skilled in the art, the present invention can utilize any blockchain platform that is fast executing, allows for a large number of transactions per second, and supports the ability to run smart contracts and execute code. For example, the present invention can utilize Ethereum blockchain platform.

In accordance with an example embodiment, the present invention can also implement off chain operations to improve the overall speed and function of the distributed network 100. Examples of off chain operations include the storage of the application data and other computations necessary to run the protocols for managing the nodes 106.

In accordance with an example embodiment, the present invention can utilize a distributed file system protocol to store unalterable data that is accessible to each of the nodes 106 within the network 100 with no single point of failure. In particular, the present invention utilizes a distributed file system to store files that should be managed and modified only by its owner but can be viewed by all the other nodes 106 in the network 100. For example, data can be stored using the InterPlanetary File System (IPFS) protocol which can be referenced through an InterPlanetary File System reference (IPNS). IPFS is said to be permanent because its files cannot be deleted. The only way to change a file is to create a new one and update the IPNS reference to point to the new file. This allows every other node, given the IPNS reference, to access and read the last version of the file. As would be appreciated by one skilled in the art, any combination of data storage protocols can be utilized without departing from the scope of the present invention (e.g., Swarm, Storj, etc.).

In accordance with an example embodiment, the present invention can classify data into two categories, private and public data. Based on the classification, the data will be treated in a certain manner within the protocols of the present invention. In particular, private data belongs to a certain node 106, and only under certain permissions, other nodes 106 can access that private data. More specifically, the private data of a node 106 is stored only by the node 106 itself and can be access by other nodes 106 only if given permission by the node 106 storing the private data. The private data is protected in this way to guarantee the privacy of the nodes 106 and to reduce the probabilities of certain attack vectors on the nodes 106. In contrast, public data can be seen by any user or node 106 within the network 100 (e.g., on the blockchain).

Examples of data to be classified as private data includes node information, stream information, node relationships, and node roles. The node information represents detailed data about a node 106 (e.g., its IP address) that is only stored locally at the node 106. The stream information represents specific data about a stream that is stored locally on the broadcaster 102. The node relationships can be the stored relationships between two nodes 106 in the network 100 (e.g., parent-child relationships, neighbors, etc.) and the nodes 106 store the relationship information only between themselves and their neighbors. The node roles in streams represents the stored roles that the node 106 has for each specific stream. Each node saves stream role information for each stream that the node 106 is connected to. Therefore, based on the public and private data designations, each node can have only a local view of the network 100 and cannot see the connections between all the other nodes 106 within the network 100. Additionally, the broadcaster 102 also stores node role information for all the nodes 106 that are serving each stream being provided by the broadcaster 102. In this way, a single node 106 is only aware of its role in all the streams in which it is participating while the broadcaster 102 is aware of all the nodes 106 and their respective roles for each stream.

In accordance with an example embodiment, the private data is stored using a database shared within a node 106. As would be appreciated by one skilled in the art, any combination of data storage systems can be utilized. For example, private data is stored in a Structured Query Language (SQL) database, another type of relational database, no-sql, etc. Each different role within the network 100, different combinations of data is stored in respective databases. In an example embodiment, broadcasters 102 can store roles and identifiers for each of the nodes 106 operating within the network to transmit the stream being provided by that broadcaster, as depicted in TABLE 1.

TABLE 1

| Broadcaster Node |
| --- |
| Child_id PK |
| Child_role PK |
| Parent_id PK |
| Parent_role PK |
| Streat_id PK |

Through the privately stored information in TABLE 1, a broadcaster 102 can reconstruct an entire graph of the nodes 106 that are delivering its stream and know their respective roles within the graph. Additionally, the identifiers of the nodes and streams can be published on the blockchain as part of the operation for the network 100.

Similar to the broadcasters 102, the origin nodes 106a, relay nodes 106b, edge nodes 106c, and subscribers 104 can maintain their own privately stored data within their respective databases. TABLE 2 and TABLE 3 depict examples of the data stored by the origin nodes 106a, relay nodes 106b, edge nodes 106c, and subscribers 104. In particular, TABLE 2 stores the information for the node's personal role within a stream and TABLE 3 stores the node relationships between the node and other nodes 106 participating within a stream.

TABLE 3

Node relationship

Child_id PK
Parent_id PK
Stream_id PK

TABLE 2

Role

Role PK
Stream_id PK, FK

The data in TABLE 2 and TABLE 3 allows a node 106 (or subscriber 104) to know its role in all the streams it is participating and also enables the node 106 to calculate a list of its neighbors for each stream.

In accordance with an example embodiment, the public data can be stored in the blockchain and can be used by the nodes 106 to validate requests from other nodes 106 within the network 100. For example, the blockchain can store smart contracts published by a broadcaster 102 with the details for a specific stream and public information about the nodes 106 that have joined the network 100. The public information about the nodes 106 does not expose any Internet Protocol (IP) addresses or Domain Name System (DNS) information but can contain the geographical position of a node 106, the timestamp of when the node 106 joined the network, a status of the node 106 ("online", "not accepting new connections" or "offline"), the IPNS that points to the file that the node 106 updates regularly with new timestamps (this file is used to know if the node is still online), and an address that can be used to interact with the node through a messaging protocol (e.g., Whisper communication protocol). Nodes will also publish on the blockchain the IPNS reference of the IPFS file that they update with their timestamps. Every node owns and updates said file regularly with a timestamp. In this way, other nodes can access it and verify whether the node is still online or not. IPFS is the best way to store this file because it allows every other node to access it but not to modify it. Moreover, changing the content of the file does not involve any blockchain transaction, so it is a very fast operation. As would be appreciated by one skilled in the art, the present invention can utilize any type of reference file other than IPNS/IPFS without departing from the scope of the present invention. TABLE 4 and TABLE 5 depict example databases for the public data stored on the blockchain for every node and stream.

TABLE 4

Node data in the Blockchain

Node_id
Whisper contact address
Online status
Proxy functionalities and domain
Region
Launch_time
IPNS to file with timestamps

TABLE 5

Node relationship

Figure 4:
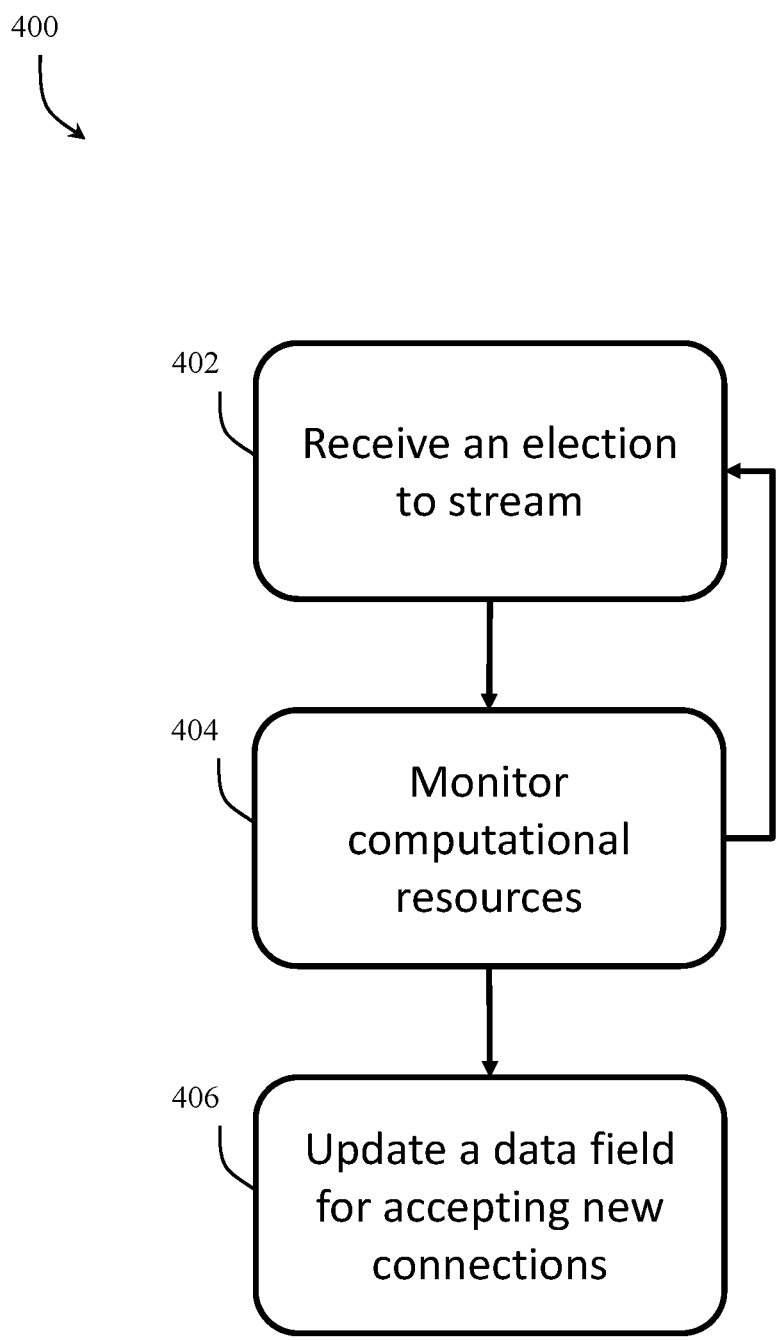
FIG. 4 is an exemplary process for electing nodes for a streaming over a decentralized network, in accordance with the present invention.
Figure 5A:
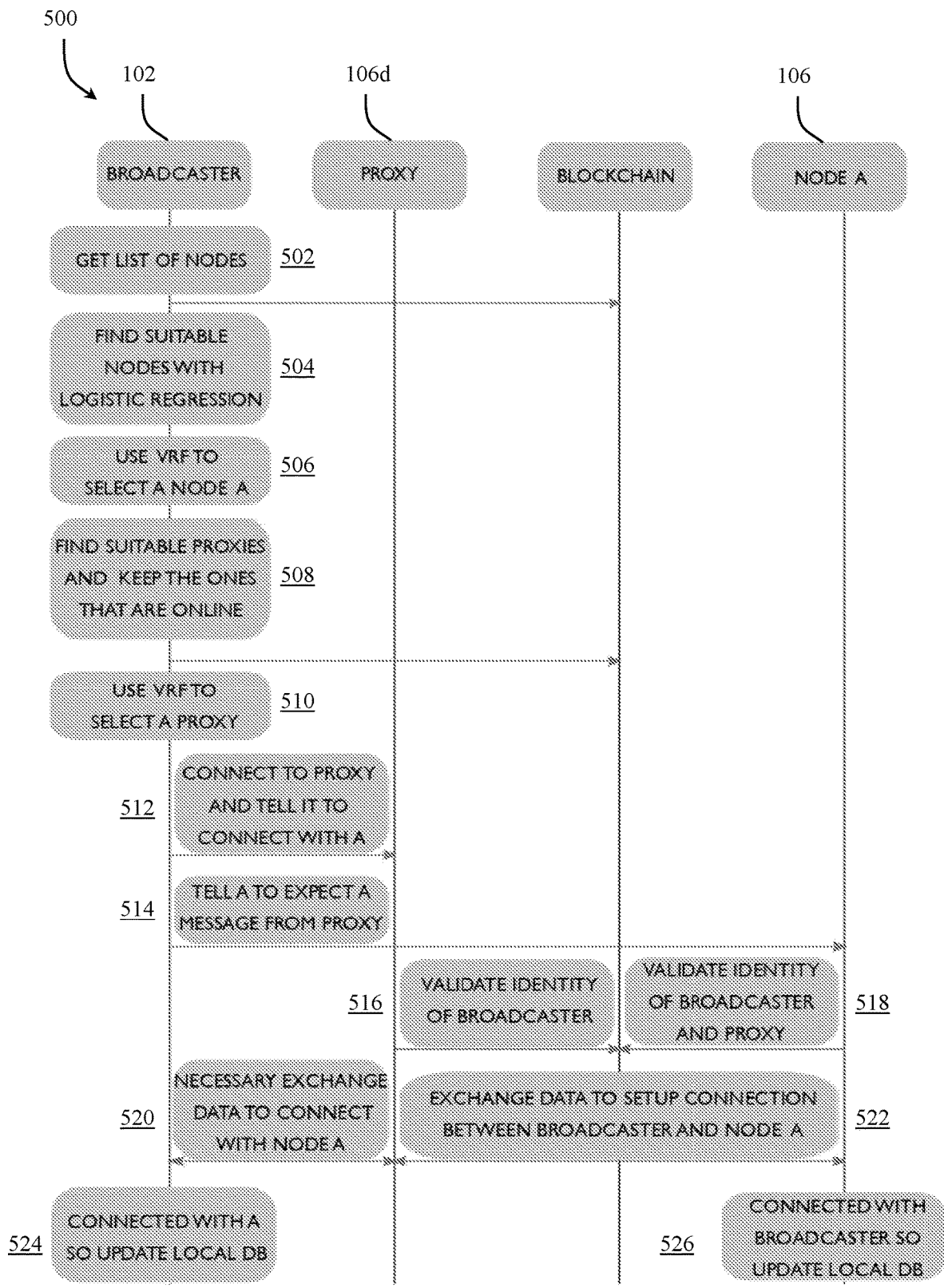
FIG. 5A is an exemplary process for implementing a WebRTC connection between a broadcaster and an origin node, in accordance with the present invention.
Figure 5B:
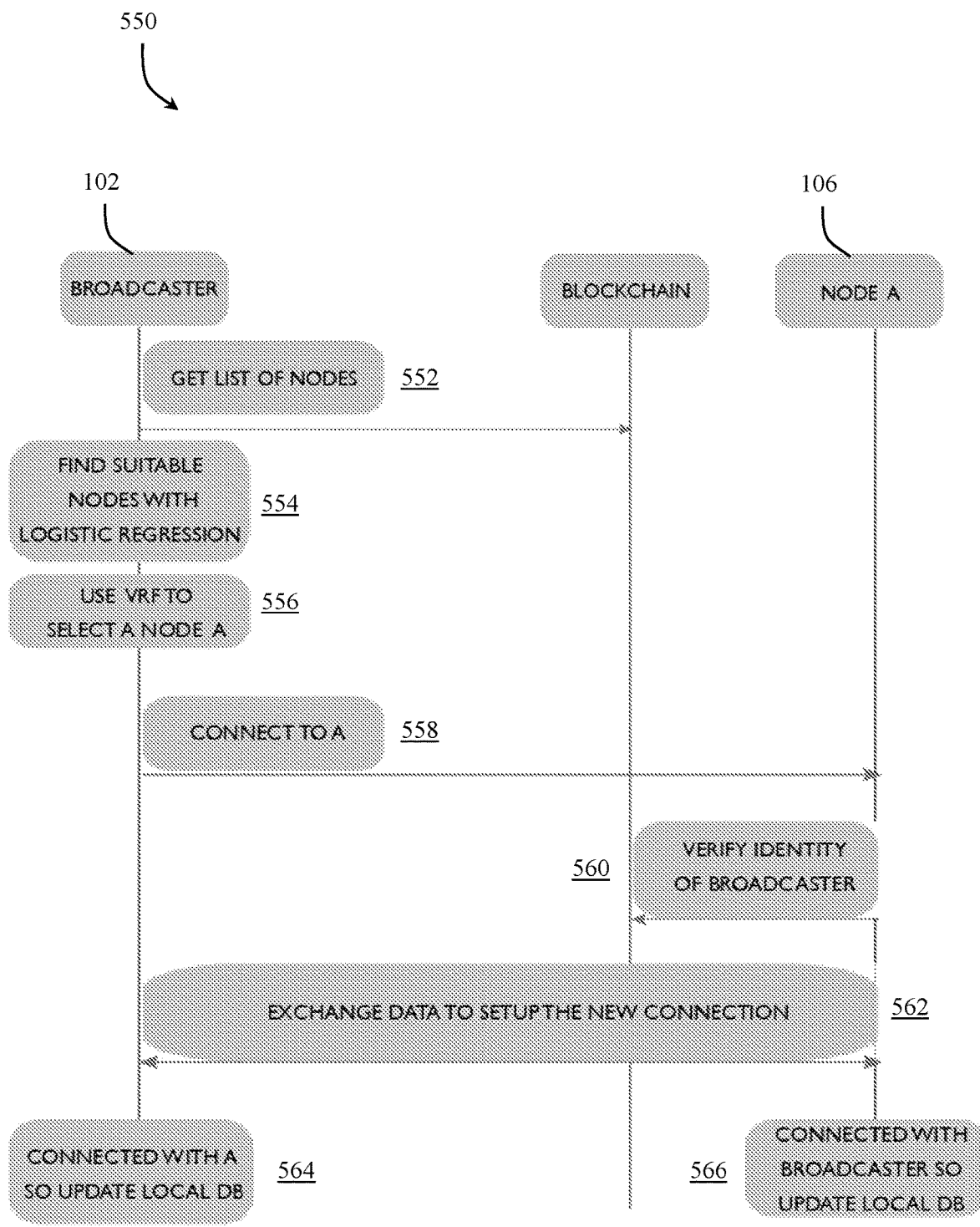
FIG. 5B is an exemplary process for implementing a connection between a broadcaster and an origin node, in accordance with the present invention.
Figure 6A:
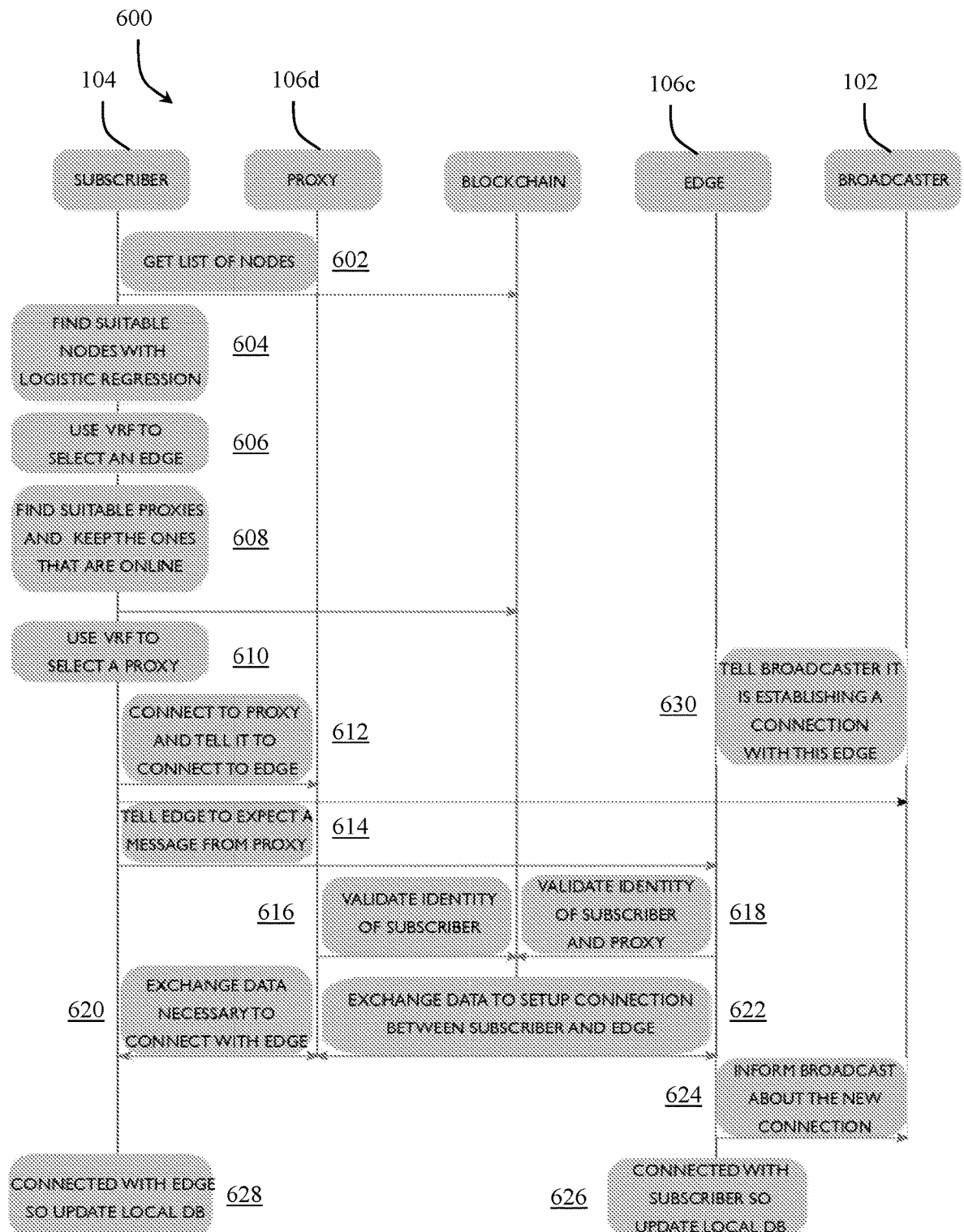
FIG. 6A is an exemplary process for implementing a WebRTC connection between a subscriber and an edge node, in accordance with the present invention.
Figure 6B:
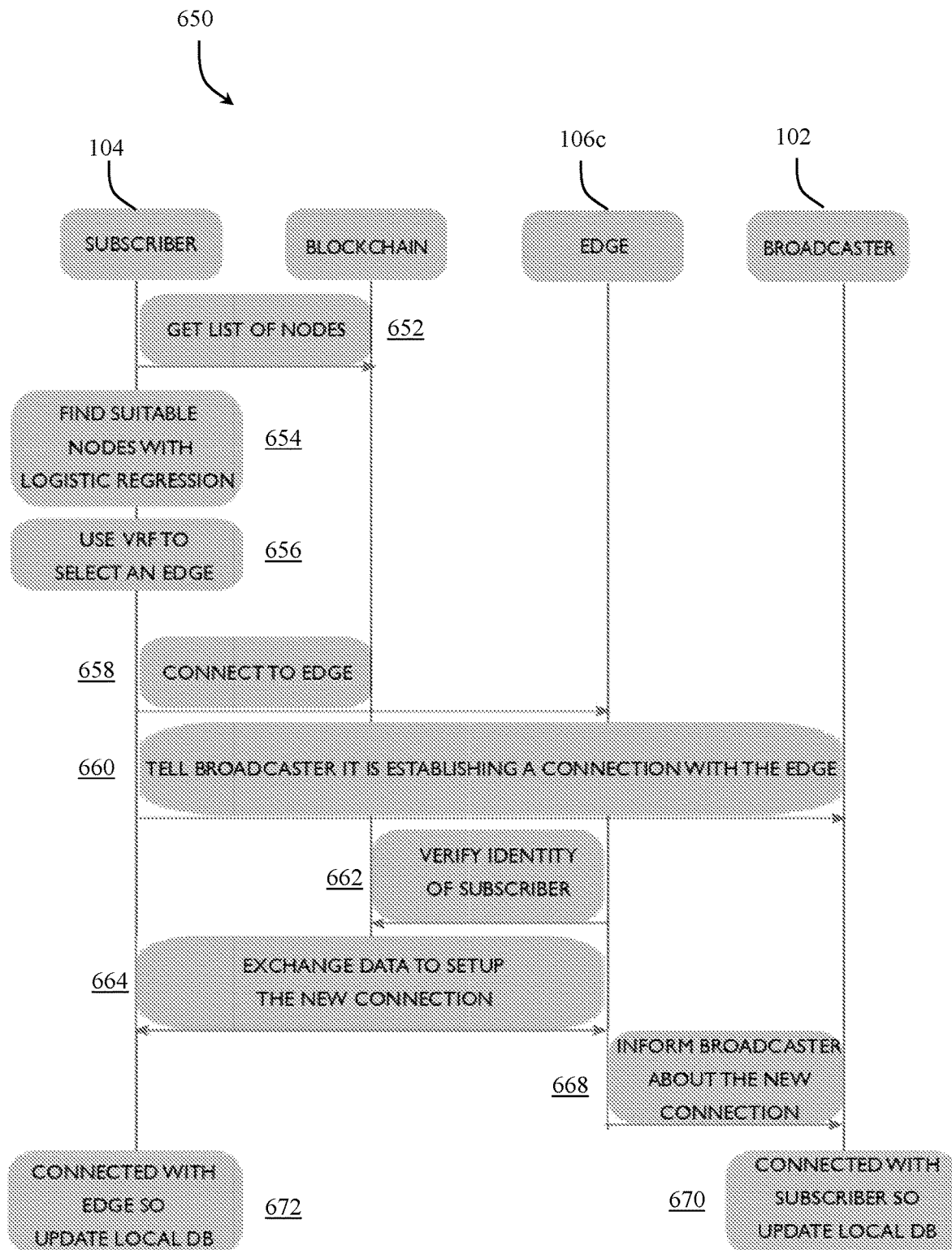
FIG. 6B is an exemplary process for implementing a connection between a subscriber and an edge node, in accordance with the present invention.

Stream_id
Broadcaster address
Authentication Server address
IPNS with blacklisted IP's
Name
Description
Geographical limitations
Start_time
End_time
Token price
Token reward per GB/s In operation, the network 100 and software implemented by the present invention is configured to allow nodes 106 to register on the network 100 (FIG. 3), allow a node 106 to leave the network 100 (FIGS. 8-9), allow a node 106 to control the number of streams it is delivering while participating within the network 100 (FIG. 4), allow a broadcaster 102 to obtain an origin node 106a (FIGS. 5A-5B), and allow a subscriber 104 to obtain an edge node 106c (FIGS. 6A-6B). Additionally, setup of a stream between a subscriber 104 and broadcaster is provided at FIGS. 7A-7B. FIGS. 3-7B depict example implementations for the functionalities provided by the network 100.

Figure 3:
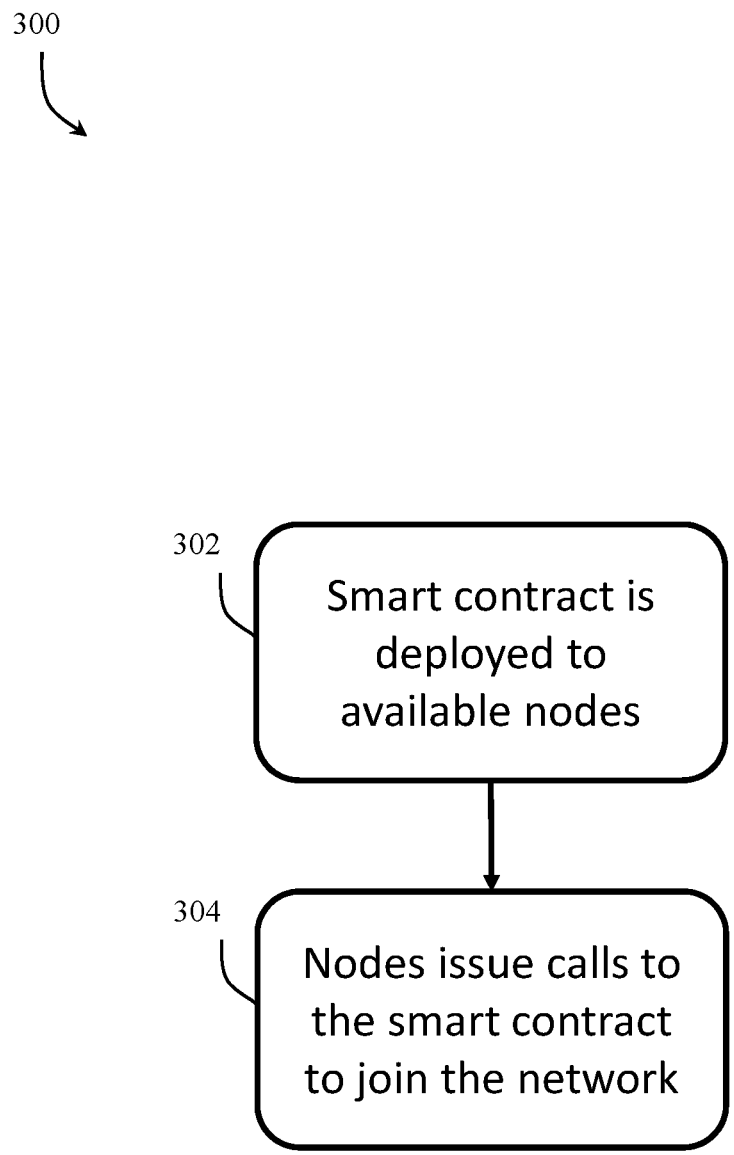
FIG. 3 is an exemplary process for registering nodes within a decentralized network, in accordance with the present invention.

Nodes 106 can be allowed to join the network 100 to build a decentralized system the enables aspects of the present invention. FIG. 3 depicts an exemplary process 300 implemented by the present invention to allow nodes 106 to register on the network 100. At step 302 a specific smart contract can be deployed (e.g., in a genesis block when the blockchain is deployed) to allow the nodes 106 register with the service to register as a node 106 within the network 100. At step 304 a new node 106 can initiate a call to the deployed smart contract to join the network 100. For example, operators of nodes 106 can register with the blockchain managing the network 100 to participate in the service. When joining the network 100, the new node 106 can publish a transaction with a combination of the geographical position of the new node, the timestamp of when the node joined the network, the IPNS of the file updated by this node with the pings, its status data field, and an address that is used to communicate with this node through the blockchain. Depending on the protocol being used, whether the node can be a proxy or not can also be distributed through the blockchain (e.g., for WebRTC). In such case, the domain name of the node should be stored so other nodes can connect directly to it.

Once nodes 106 have joined the network 100, they will be available for election to participate in the streaming roles by other nodes 106, broadcasters 102, and subscribers 104. In accordance with an example embodiment, the network 100 can utilize logistical regression to determine which nodes of available nodes 106 on the network 100 could be elected for a particular role within one or more streams from the broadcasters 102. As would be appreciated by one skilled in the art, logistic regression is a statistical method used for analyzing a dataset to determine an outcome. The outcome is of the logistical regression utilized by the present invention can be a pass/fail type such that only nodes with an outcome of "pass" will be considered in the election process. Thereafter, an election can be executed by applying a Verifiable Random Function (VRF) on the passing nodes (from the logistical regression). Initially, each node can be characterized by a geographical position of the node, a bandwidth score for the node, a packet loss score for the node, and age of the node (e.g., time on the network). In an example embodiment, these features can be published or extracted from the data on the blockchain. This is necessary to allow every node to be able to run the election process without interacting with any other node.

In accordance with an example embodiment, the geographical position of a node is used to calculate the distance between a node and the node running the election. In particular, when a node joins the network 100, as discussed with respect to FIG. 3, the network 100 will calculate a geographical position of the node based on the IP address of the node at the time of joining and the geographical region associated with the calculated geographical position can be published on the blockchain. The first step to calculate the distance for nodes is to map each region to a value. For example, nodes can be grouped based on the continent where they are physically located and each continent can be mapped to a value (e.g., Africa=0, Europe=1, America=2, Asia=3, Oceania=4, etc.). Thereafter, the network can elect and an origin node 106a and edge node 106c for a given broadcaster 102 and subscriber 104 based on a continent distance parameter calculated as broadcaster continent—candidate_origin_continent. Continuing the example, if the broadcaster 102 is in America (e.g., 2) and a candidate origin is in Africa (e.g., 0) then their distance would be two (e.g., 2-0). The smaller the distance between the node running the election and one of the passing nodes, the higher the chances of being elected to deliver the stream. The minimum distance between an elector and a candidate is zero (e.g., same region value). As would be appreciated by one skilled in the art, any method for calculating a distance can be utilized without departing from the scope of the present invention.

In accordance with an example embodiment, the bandwidth score can provide a basis of determining how much bandwidth a node can provide. The bandwidth score can be calculated from the transactions that the node receives from the broadcasters 102. For example, the bandwidth score can be calculated by calculating a sum of all the Gb/s of every transaction generated since the node joined the network 100, calculating a sum of all the Gb/s of every transaction sent to this node, and dividing the sum of all the Gb/s of every transaction sent to this node by the sum of all the Gb/s of every transaction generated since the node joined the network and multiplying that total by ten. The resulting value represents the amount of bandwidth for which this node has been rewarded over the total amount of bandwidth that was exchanged since it joined the network scaled over the interval [0,10]. A higher bandwidth score increases the chances for the node to be chosen to deliver new streams. As would be appreciated by one skilled in the art, any method for calculating a bandwidth score can be utilized without departing from the scope of the present invention.

In accordance with an example embodiment, the packet loss score can be calculated by determining the average packet loss at a node. For example, the average packet loss can be calculated by calculating a sum of all the packet losses reported (e.g., by neighbor nodes) in the transactions that a node receives and dividing the sum by the total number of transactions. Then, the average packet loss can be mapped into the interval [0,10] as done in the bandwidth score. A value close to zero represents a packet loss close to 0%, which is optimal. Therefore, the lower the packet loss of a node the higher its chances to be chosen to deliver new streams. As would be appreciated by one skilled in the art, any method for calculating packet loss score can be utilized without departing from the scope of the present invention.

In accordance with an example embodiment, age can represent an amount of time that a node has been in the peer-to-peer network without streaming any video. Age can be used to make it more likely for old nodes to be chosen to stream a new video. Age can be calculated as the time elapsed since the last transaction a node received for the streams it delivered. Then, this value can be mapped in the interval [0,10]. For example, if less than 60 minutes have elapsed since the node was involved in a transaction (if 60 minutes is a threshold value), then age is equal to zero. Otherwise the age value can add one unity for each hour elapsed up to maximum ten hours. A larger age value increases the chances of a node to be chosen to deliver the next streams. As would be appreciated by one skilled in the art, any method for calculating age can be utilized without departing from the scope of the present invention. Once again, age can be calculated by using the data in the blockchain.

In accordance with an example embodiment, logistic regression can be utilized to create a dataset to be used as a model and trained to generate an output model which can be used to predict a passing outcome of nodes given their features. An example of the training/modeling process, using a very limited dataset, is provided in TABLE 6 below.

TABLE 6

| Row | Bandwidth | Packet loss | Age | Distance | Outcome |
| --- | --- | --- | --- | --- | --- |
| 1 | 0 | 0 | 0 | 0 | 1 |
| 2 | 1 | 3 | 0 | 3 | 0 |
| 3 | 1 | 1 | 0 | 1 | 0 |
| 4 | 7 | 2 | 0 | 1 | 1 |
| 5 | 2 | 1 | 0 | 0 | 1 |
| 6 | 7 | 8 | 0 | 0 | 0 |
| 7 | 9 | 2 | 0 | 1 | 1 |
| 8 | 5 | 0 | 1 | 1 | 1 |

Using the above characterizations, the present invention can build a data set similar to the exemplary data set provided in TABLE 6 to be used in training/modeling. In the data set there are entries for each of the above-noted derived metrics. For example, there is a column for bandwidth score, packet loss score, age, and distance. Additionally, there is a data entry for an outcome value, which is a determination as to whether an available node will be determined to have a passing mark (e.g., 1 for pass, 0 for fail). Each row in TABLE 6 represents a different node that has been evaluated.

Based on the exemplary information in TABLE 6, the node in row 1 passes because the node is new (e.g., age=0), the nodes in rows 2 and 3 fail because their bandwidth score is too low, the nodes in rows 4, 5, and 7 pass because bandwidth is good, packet loss is limited, and the distance is reasonable, the node in row 6 fails because the packet loss is too high (even though bandwidth is good), and the node in row 8 passes because everything is reasonable. The data set of TABLE 6 provides the basis for an algorithm to predict when a node should pass or fail based on derived characterizations (e.g., bandwidth, packet loss, age, distance, etc.). Accordingly, building a good dataset is a key component for the correct behavior of the algorithm. As would be appreciated by one skilled in the art additional or a subset of the example characterizations provided herein can be utilized based on network preferences without departing from the scope of the present invention.

Once the dataset is built, it provides a model data set that can be trained. Using the model data set and training the algorithm will allow the algorithm to operate fast because it uses data available on the blockchain, and retrieving it does not require running any smart contract. Therefore, the algorithm can run the model to predicted outcome formulae for every node in the system very efficiently. Thereafter, passing nodes can be elected to participate in streaming multimedia over the network 100. As would be appreciated by one skilled in the art, the model data set can be updated periodically and the algorithm retrained as more data becomes available and preferences change.

When a node joins the network 100, as discussed with respect to FIG. 3, it automatically becomes available to deliver any number of streams from requesting nodes. Without restriction, this could create a situation where the node is assigned more streams than it can handle. That, in turn, would increase the potential for packet loss seen by the receiving nodes potentially negatively impact stream quality to end users. To avoid such situations, nodes must be able to inform the network that they are not available for new connections. This can be achieved by modifying the status data field which is included in the transaction that the node published when it registered on the network 100. FIG. 4 depicts an exemplary process 400 implemented by the network 100 that allows nodes 106 to control the number of streams it is delivering.

At step 402, subsequently to joining the network 100, nodes 106 can receive elections to stream from broadcasters 102. When a node is elected to stream it can be assigned a role (e.g., origin, relay, edge) and can begin streaming multimedia to specified neighboring nodes. Once a node has joined the network 100, at step 404, the node will actively monitor their availability of resources and act accordingly. For example, nodes monitor CPU, memory usage, etc. and evaluate if they are hitting a limit on their streaming capacity. If a node 106 determines that it is near or exceeding its capacity, at step 406, the node can update its data field to "Not accepting new connections". For example, the node updates the data field through a smart contract function. In this way, during the next election processes, the other nodes (including broadcasters 102 and subscribers 104) will not include this node in the available pool of nodes for election, as elections include only nodes which status is "online" and accepting new connections. Additionally, if another node attempts to set-up a connection with a node that is not accepting new connections, the target node will refuse the request.

Once nodes can be active and available on the network 100, broadcasters 102 can elect one or more nodes 106 to act as origin nodes 106a. Initially, when electing an origin node 106a for a stream, the broadcaster 102 can query to identify what nodes 106 are available to stream. In particular, the broadcaster 102 can use the public data in the blockchain to retrieve a list of available nodes 106 in the network 100. Once the broadcaster 102 has the list with all the nodes, it will use logistic regression to determine which of these nodes 106 are suitable to become origin nodes 106a. Once the set of suitable origin nodes 106a is determined, the broadcaster 102 selects one of those nodes 106 randomly to be elected as the origin node 106a for the stream. For example, a broadcaster can use a verifiable random function (VRF) to randomly choose a node 106. Additionally, the VRF can be used to know if the broadcaster 102 chose an origin node 106a randomly, or if it cheated in an attempt to control the traffic to particular nodes 106.

After electing an origin node 106a for a stream, the next steps that the broadcaster 102 will execute depends on the communication protocol being utilized. In accordance with an example embodiment, WebRTC, or a similar protocol, can be used to provide real-time communication protocol used between broadcasters 102 and origin nodes 106a and subscribers 104 and edge nodes 106c because WebRTC has very high security built-in with Datagram Transport Layer Security (DTLS) and SRTP for encrypted streams, as discussed in greater detail herein. WebRTC also guarantees very low latency and User Datagram Protocol (UDP) delivery or Transmission Control Protocol (TCP), which is crucial for real-time video streaming. When using WebRTC, or similar protocol, to setup a connection between the broadcaster 102 and an origin node 106a (or subscriber 104 and edge node 106c) to send and receive video/audio, it is necessary to negotiate the connection parameters via a signaling protocol. WebRTC does not specify how the signaling messages for the signaling protocol should be exchanged, but it mandates that they are exchanged over a secure connection like HTTPS or Web Services Security (WSS). Thus, to implement WebRTC, the network 100 can implement utilization of a proxy node 106d to which the broadcaster 102 can connect through WSS. Thereafter, the proxy node 106d will connect to the origin node 106a, as depicted in FIG. 2. For example, the proxy node 106d can make the connection through WebSockets, and mirror all the signaling messages it receives from the broadcaster 102.

When utilizing a WebRTC protocol there are at least two types of signaling data that is exchanged. The types include Session Description Protocol (SDP) session control messages and ICE candidates. SDP is a format for describing the capabilities of a media capable device. In the present invention, the media capable devices can be the origin nodes 106a, the edge nodes 106c, and the browser used by the broadcaster 102 and/or subscriber 102. During the session description exchange process, the browser can send a list of its capabilities (e.g., which codecs it can use, the resolutions it can produce, and other detailed information to set-up the stream) to the origin node 106a. The origin node 106a can respond back with what it can handle. Once the two sides agree on how they can communicate, the process moves to the ICE candidates phase. ICE is a protocol used to establish connections between devices across the Internet. The information in an ICE candidate includes whether to use UDP or TCP for transmission, the IP address of the client, and other details for making a direct connection to the peer.

ICE also consists of two sub-protocols known as Session Traversal Utilities for Network Address Translation (NAT) (STUN) and Traversal Using Relays around NAT (TURN). STUN is used to bypass firewalls/NATs, and TURN is used if it can't get a direct P2P using STUN. A STUN server allows clients to find out their public address, the type of NAT they are behind and the Internet side port associated by the NAT with a particular local port and TURN is a protocol that allows a client to obtain IP addresses and ports from such a relay. STUN and TURN servers can be fundamental to be able to set-up WebRTC connections, in accordance with the present invention.

In an example embodiment, the STUN and TURN servers can be implemented by nodes 106 registered in the network 100 and can be elected randomly by a subscriber 104 and/or broadcaster 102 that needs to set-up a WebRTC, or similar protocol, connection. Therefore, when a new node joins the network 100 it publishes (on the blockchain) a transaction whether the node can be used as a STUN and or TURN server. For example, the eligible proxy nodes 106d will provide a public IP address at which any node 106 can connect to use them as STUN or TURN servers. Thereafter, to setup a WebRTC connection, a broadcaster 102 can use the public data obtained from the blockchain to retrieve a list of nodes 106 that can be used as proxy nodes 106d and STUN or TURN servers. In an example embodiment, the STUN and TURN servers can be elected using the same process as electing proxy nodes 106d (as discussed in greater detail with respect to FIGS. 5A and 6A). Moreover, when electing proxy nodes 106d, the broadcasters 102/ subscribers 104 (e.g., electors) will prefer nodes that can be proxy nodes 106d as well as implement STUN and TURN functionalities to guarantee faster connections because there won't be the need to run another election (e.g., for both proxy nodes 106d and STUN/TURN).

After choosing a proxy node 106d and STUN and TURN servers, the broadcaster 102 can connect to the proxy node 106d via its domain name using WSS and can instruct the proxy node 106d to establish a connection with an elected origin node 106a. Thereafter, the proxy node 106d can contact the origin node 106a using WebSockets and will start the information exchange or WebRTC signaling to setup the connection. The signaling can use the STUN or TURN server capabilities provided by the proxy node 106d, if available, otherwise another node with such functionalities will be elected alongside the proxy node 106d.

In an example embodiment, the broadcaster 102 can also connect to the origin node 106a directly (e.g., through Whisper) and inform the node to expect a message coming from the chosen proxy node 106d. This process can include transmitting identifying information for the proxy node 106d to the origin node 106a. This will allow the origin node 106a to accept the incoming connection and inform the broadcaster 102 if the origin node 106a does not receive an incoming connection, which in turn will cause the broadcaster 102 to elect a new proxy node 106d and repeat the process. Additionally, when the node 106 that has been chosen as origin node 106a receives a message from the broadcaster 102, the origin node 106a will use the blockchain to validate the identity of the broadcaster 102. That is, the origin node 106a will check if the broadcaster 102 is the node that published the smart contract for this specific stream. The origin node 106a will also do the verification part of the VRF to determine whether the broadcaster 102 followed the protocol when electing the proxy node 106d. If so, the origin node 106a will accept the incoming Whisper messages and allow the specified proxy node 106d to set up a connection between the broadcaster 102 and the origin node 106a. Once the connection is setup, all of the nodes and the broadcaster 102 will update their local database with the new parent-child relationship information and with their roles (e.g., broadcaster, origin, proxy) in the stream.

FIG. 5A depicts an exemplary process 500 for establishing a connection between a broadcaster 102 and an origin node 106a when using protocols (e.g., WebRTC) that require a proxy node 106d as discussed herein. At step 502 the broadcaster 102 obtains a list of available nodes (e.g., via the blockchain). At step 504 the broadcaster 102 determines a list of suitable nodes from the list of available nodes utilizing logistical regression. At step 506 the broadcaster 102 utilizes VRF to randomly select a node (e.g., Node A). At step 508 the broadcaster 102 determines a list of suitable proxy nodes 106d from the list of available nodes (e.g., via the blockchain). At step 510 the broadcaster 102 utilizes VRF to randomly select a proxy node 106d from the list of suitable proxy nodes 106d. At step 512 the broadcaster 102 connected to the selected proxy node 106d and transmits an instruction to the proxy node 106d to connect with Node A. At step 514, simultaneously to or subsequently to step 512, the broadcaster 102 transmits a message to Node A to expect a message from the selected proxy node 106d.

At step 516, in response to receiving the transmission from the broadcaster 102, the proxy node 106d validates the identity of the broadcaster 102 utilizing the blockchain. Similarly, at step 518, in response to receiving the transmission from the broadcaster 102, Node A validates the identity of the broadcaster 102 utilizing the blockchain. After the proxy node 106d and Node A verify the identity of the broadcaster 102 the process 500 advances to steps 520 and 522. At step 520 the broadcaster 102 transmits, to the proxy node 106d, the necessary data for the proxy node 106d to connect to Node A. At step 522 the proxy node 106d performs the necessary exchange of data to connect the broadcaster 102 with Node A. After the connection between the broadcaster 102 and Node A is established, at step 524 the broadcaster 102 updates a local database with the information for Noda A. Similarly, at step 526 Node A updates a local database with the information for the connection to the broadcaster 102.

In accordance with an example embodiment, broadcasters 102 can utilize a private origin node 106a in place of an elected origin node 106a and/or proxy node 106d such that the private origin node 106a would interface directly with relay nodes 106b. All a broadcaster needs to do in this case is specify in the stream's smart contract that it is using a private origin which instruct relay nodes 106b to not elect an origin but directly contact the broadcaster to setup the connection with the origin. This solution is ideal for broadcasters 102 that want to deliver end-to-end encrypted and paid streams. In particular, a private origin allows broadcasters 102 to ingest into the network 100 using an already encrypted stream which will be decrypted only at the subscribers if they acquired a valid Digital Rights Management (DRM) key. This guarantees that no other node 106 in the network 100 can have access to it unless they break the encryption. Therefore, with this solution it is possible to achieve an end-to-end fully encrypted multimedia stream.

As would be appreciated by one skilled in the art, not every broadcasters client supports and./or requires WebRTC or all of its components and other protocols may be preferred in certain situations, therefore, the proxy node 106d is not required when the network 100 is not using WebRTC or similar protocol (e.g., requiring the exchange of SSL certificates). For example, the broadcaster 102 can utilize RTMP or Real-Time Streaming Protocol (RTSP). In the instances where no proxy node 106d is utilized, the message exchange happens only between broadcaster 102 and origin node 106a and the other steps (e.g., election) remain the same as in WebRTC. FIG. 5B depicts an exemplary process 550 for establishing a connection between a broadcaster 102 and an origin node 106a when using protocols (e.g., RTMP, RTSP, SRT, etc.) that do not require a proxy node 106d.

FIG. 5B depicts an exemplary process 550 for establishing a connection between a broadcaster 102 and an origin node 106a without the requirement of a proxy node 106d. At step 552 the broadcaster 102 obtains a list of available nodes (e.g., via the blockchain). At step 554 the broadcaster 102 determines a list of suitable nodes from the list of available nodes utilizing logistical regression. At step 556 the broadcaster 102 utilizes VRF to randomly select a node (e.g., Node A). At step 558 the broadcaster 102 connects directly to the selected Node A. At step 560, in response to receiving the connection request from the broadcaster 102, Node A validates the identity of the broadcaster 102 utilizing the blockchain. After Node A verifies the identity of the broadcaster 102, the process 550 advances to step 562. At step 562 the broadcaster 102 and Node A exchange the necessary data setup a connection and establish the connection. After the connection between the broadcaster 102 and Node A is established, at step 564 the broadcaster 102 updates a local database with the information for Noda A. Similarly, at step 566 Node A updates a local database with the information for the connection to the broadcaster 102.

The processes (600, 650) for a subscriber 104 to obtain an edge node 106c is similar to the processes (500, 550) used by the broadcaster 102 to assign an origin node 106a. As with electing an origin node 106a, the process for obtaining an edge node 106c will depend on the communication protocol used (e.g., whether a proxy node 106d will be required).

FIGS. 6A and 6B depict exemplary processes 600, 650 for a subscriber 104 obtaining an edge node 106c. In particular, FIG. 6A depicts exemplary process 600 in which a proxy node 106d is required (e.g., using WebRTC or similar protocol) and FIG. 6B depicts exemplary process 650 in which a proxy node 106d is not necessary (e.g., RTMP, RTSP, HLS, MPEG-DASH, etc.). Initially, in both process 600 and 650, the subscriber 104 can use the blockchain to retrieve a list of available nodes 106 (steps 602, 652). Then, the subscriber 104 will use logistic regression to calculate a set of suitable nodes to be an edge node 106c (steps 604, 654). Thereafter, the subscriber will utilize VRF to pick a random node 106 from the set of suitable nodes to be an edge node 106c to be the edge node 106c (steps 606, 656). From this point, the process 600, 650 will vary based on the requirement of a proxy node 106d.

Continuing with FIG. 6A, if the subscriber 104 is setting up a connection that requires user of a proxy (e.g., WebRTC), the subscriber 104 will elect a proxy node 106d following a similar steps 608-610 as the steps 508-510 discussed with respect to FIG. 5A. Once a proxy node 106d is elected, the subscriber 104 will connect to the proxy node 106d and instruct the proxy node 106 to connect to the edge node 106c (step 612). Simultaneously to or subsequently to step 612, the subscriber 104 transmits a message to the edge node 106c to expect a message from the selected proxy node 106d (step 614). In response to the connection request from the subscriber 104, the proxy will validate the identity of the subscriber 104 with the blockchain (step 616). In an example embodiment, the edge node 106c will also check the correctness of the information it receives from both the proxy node 106d and the subscriber 104 and will accept the connection and exchange data with the proxy node 106d to establish a connection with the subscriber 104 upon confirmation (step 618). After verification of the identity of the subscriber 104, the subscriber 104 transmits, to the proxy node 106d, the necessary data for the proxy node 106d to connect to the edge node 106c (step 620). The proxy node 106d uses the received data to establish an exchange of data between the subscriber 104 and the edge node 106c (step 622). Once the connection is established, the edge node 106c will also store its role for this specific stream and send a message to the broadcaster 102 of the stream to let the broadcaster 102 know that the edge node 106c has connected with the subscriber 104 for the stream provided by the broadcaster 102 (step 624). The edge node 106c will also store the relationship information between itself and the subscriber 104 in its own local private database (step 626). Similarly, the subscriber 104 will update the local database with the connection information with the edge node 106c (step 628). Additionally, the subscriber will notify the broadcaster 102 that it is establishing a connection with the selected edge node 106c (step 630). Thus, the broadcaster 102 receives two messages which content match and, so it updates its local database with the information about the new connection between the subscriber 104 and the edge node 106c.

Returning to the process 650 of FIG. 6B, because the protocol for process 650 does not require a proxy node 106d, the process can advance from the selection of an edge node (step 656) to establishing a connection with the selected edge (step 658). Once the connection is established, or simultaneous to establishing the connection, the subscriber 104 transmits a message to the broadcaster 102 of the desired stream letting the broadcaster 102 know that the subscriber 104 is establishing a connection with the selected edge node 106c (step 660). In response to the connection request from the subscriber 104 the edge node 106c will verify the identity of the subscriber from the blockchain (step 662). After verification of the identity of the subscriber 104, the subscriber 104 exchanges the necessary data for establishing a connection directly with the edge node 106c (step 664). The proxy node 106d uses the received data to establish an exchange of data between the subscriber 104 and the edge node 106c (step 622). After establishing the connection, the edge node 106c will inform the broadcaster 102 about the new connection (step 668) and store the relationship information between itself and the subscriber 104 in its own local private database (step 670). Similarly, the subscriber 104 will update the local database with the connection information with the edge node 106c (step 672). Thus, the broadcaster 102 receives two messages which content match and, so it updates its local database with the information about the new connection between the subscriber 104 and the edge node 106c.

Based on a distance between a subscriber 104, a broadcaster 102, and their respective origin node(s) 106a and edge node(s) 106c, relay nodes 106b may be necessary to stream multimedia between the broadcaster 102 and subscriber 104. To elect relay node(s) 106b, the edge node(s) 106b can repeat the same process the subscriber 104 performed to elect the edge node 106c. The relay node 106b election process will continue until a connection between a relay node 106b and the origin node 106a is established (which will connect to the broadcaster 102). Once all the connections have been set up, the subscriber 104 will be able to start watching/listening to the multimedia stream provided by the broadcaster 102 over the distributed decentralized network 100. No smart contract is involved in this process and only data already published on the blockchain is used. This implies that this process does not require any gas.

In accordance with an example embodiment, for each node elected for participation within a stream, there can be a backup node elected for the same role (e.g., back origin for each origin, backup relay for each relay, backup edge for each edge, etc.) within the stream to establish redundancy for consistency of the stream. In particular, the network implements a failover procedure to avoid poor subscriber experiences in case a node disconnects and/or fails suddenly. Providing backups for each elected node prevents or reduces interruptions to a stream.

In an example embodiment, a backup node can be elected simultaneously with the election of the main node (the node being backed up). During the stream, the stream will simultaneously be delivered to both nodes while only the main edge node will deliver the stream (from the broadcaster 102 to the subscriber 104) such that the backup edge node will only receive the stream and be ready to deliver it in case the main edge node fails. For the connection between the subscriber 104 and the edge node 106c/backup edge node 706c, the subscriber client maintains a connection to the backup edge node 706c, but no data is flowing. In the event of a failure to the primary edge node 106c, the data will begin to flow from the backup edge node 706c much in the same way a backup node takes over in a node to node connection. Similar to the main nodes, the backup node shares information with all the neighbors of the main node such that the neighbor nodes know who will take over in the event of a failure to the main node. In other words, the backup nodes are implemented and function in the same way as their main counterpart node but the backup nodes do not deliver the streams to the subscriber 104 unless the corresponding main edge node fails.

Figure 7A:
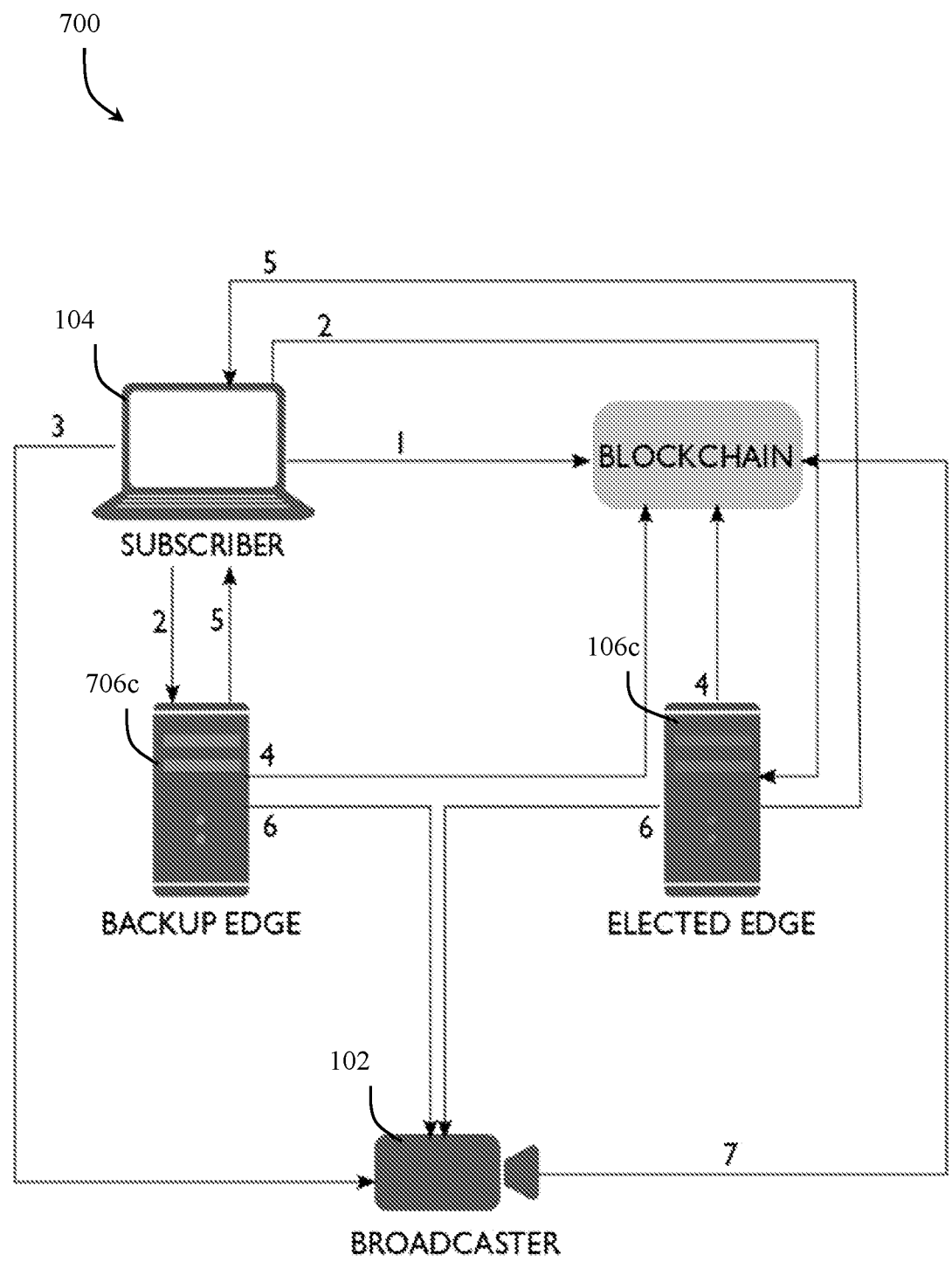
FIG. 7A is an exemplary process for electing a backup edge node, in accordance with the present invention.
Figure 7B:
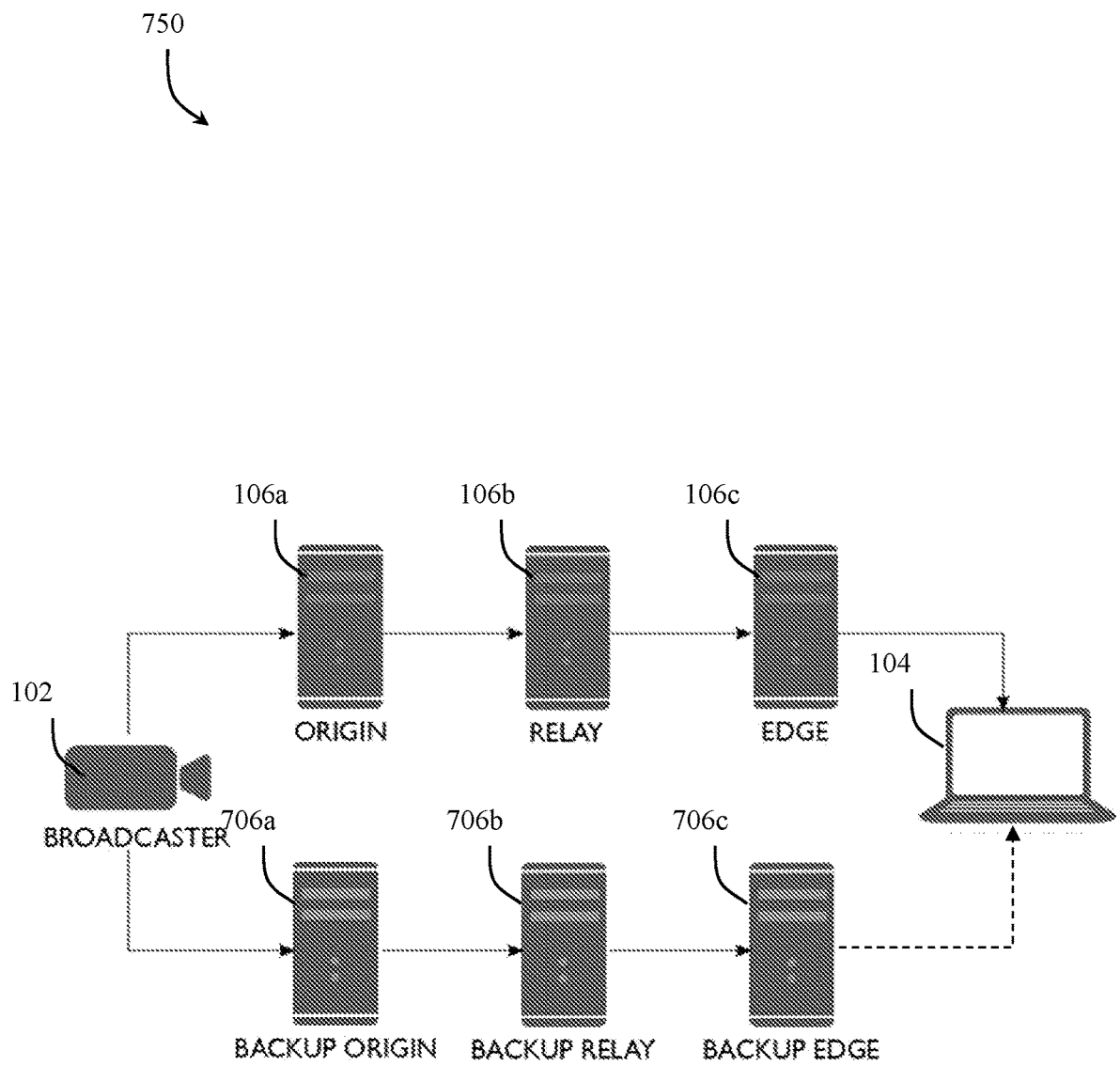
FIG. 7B is an exemplary process for delivering a stream between a broadcaster and a subscriber while implementing backup nodes, in accordance with the present invention.

FIGS. 7A and 7B depict exemplary implementations of backup nodes elected within the network 100. In particular, FIG. 7A depicts a process 700 to elect an edge node 106c and a backup edge node 706c. At step 1 of process 700 the subscriber 104 gets list of available nodes 106 from the blockchain and runs random elections for each role in the stream (e.g., using VRF). In this example, the subscriber 104 is electing an edge node 106c while also electing a backup edge node 706c. At step 2 of process 700 the subscriber 104 contacts the two elected nodes (106c, 706c). At step 3 of process 700 the subscriber 104 informs the broadcaster 102 of the stream about the new connections it is creating. At step 4 of process 700 the elected nodes (106c, 706c) validate the subscriber 104 identity using the blockchain. At step 5 of process 700, if validated, both nodes (106c, 706c) exchange data with the subscriber 104 to setup the new connections. At step 6 of process 700 the elected nodes (106c, 706c) inform the broadcaster 102 about the new connections. At step 7 of process 700 the broadcaster 102 validates other node (106c, 706c) identities using the blockchain and accepts the new connections. The process 700 can also include similar steps as discussed with respect to FIGS. 6A and 6B when electing an edge node 106c but applying those steps to both the election of an edge node 106c and a backup edge node 706c.

FIG. 7B depicts a process 750 for delivery of a stream between a single broadcaster 102 and subscriber 104 using main and backup nodes. In particular, FIG. 7B, depicts how the backup nodes 706a, 706b, 706c provide a mirrored copy of operation as the main nodes 106a, 106b, 106c. Taking a subscriber-edge node connection as an example, the process 750 with start with a subscriber 104 running the protocol to choose an edge node 106a. Once the edge node 106a is chosen, the subscriber 104 will ask it if it has already a backup edge node 706c. If the backup edge node 706c has already been elected then the edge node 106a will return the information for the backup edge node 706c to the subscriber 104. If a backup edge node 706c has not been elected, then the subscriber 104 will run another election and repeat the election process as performed for electing the edge node 106c (e.g., as discussed with respect to FIG. 7A). The newly elected node will be the backup edge node 706c.

The broadcaster 102 can be informed about the elected backup node 706c as well. Thereafter, the same election process is repeated for all edge nodes 106c, relay nodes 106b and origin nodes 106c until a circuit is built between a broadcaster 102 and a subscriber 104 is created, as depicted in FIG. 7B. A circuit can be defined as an arrangement of nodes 106 with one or more efficient transmission routes (connection paths) established between them. Once the circuits are built the multimedia stream can be delivered both through the main nodes (106a, 106b, 106c) and the backup nodes (706a, 706b, 706c). The only difference between the two circuits is that backup edge node 706c only receive the stream and will only deliver the stream to the subscriber 104 if the main edge node 106c fails. All of the other nodes will receive and transmit data regardless if they are a main node or a backup node. Although FIG. 7B depicts a single broadcaster 102 and subscriber 104, any number of broadcasters and subscribers could be utilized without departing from the scope of the present invention. Additionally, a single node can act as backup node for multiple other nodes and at the same time it can be a main node for other streams.

Figure 8:
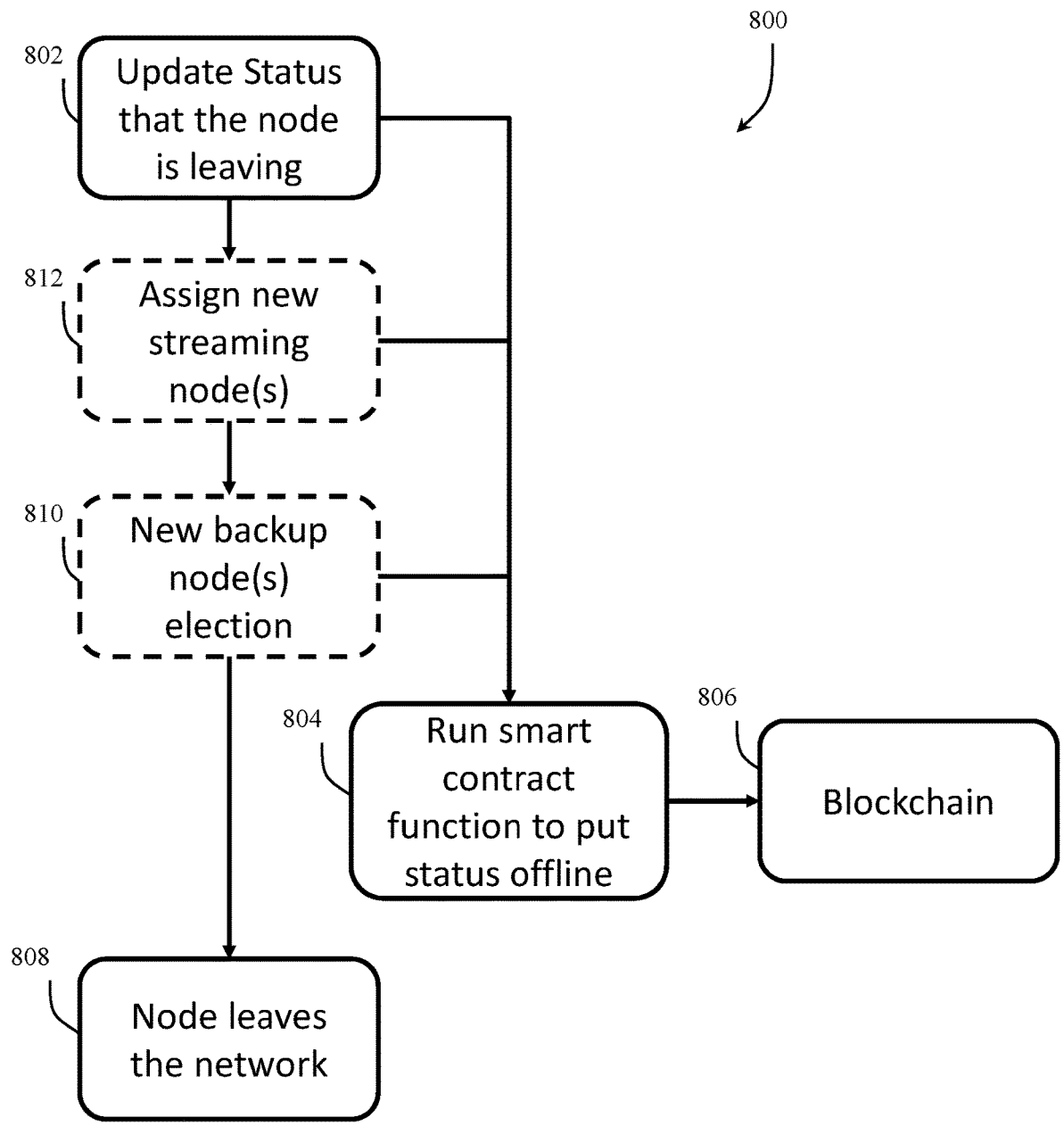
FIG. 8 is an exemplary process for nodes disconnecting from participation within a decentralized network, in accordance with the present invention.

Nodes 106 that have joined the network, as discussed with respect to FIG. 3, can leave the network without any penalties (even in instances when the node 106 is delivering a stream(s) at the time of departure). To maintain a quality of streaming over the network 100, nodes 106 need to be able to leave the network while ensuring that none of the other nodes 106 in the network 100 are relying on the departing node 106 for delivering a stream before the node 106 disconnects. FIG. 8 depicts an exemplary process 500, implemented by the network 100, that allows nodes 106 to leave the network 100 while ensuring that streams are not negatively affected by the departure of the node 106.

At step 802 the node 106 intending to leave the network 100 updates the public status data field on its smart contract to "offline". In this way, other nodes will no longer include that node in their election process. If the node 106 is not currently delivering a stream, the process advances to step 804. At step 804 the node 106 executes a smart contract function and update its status and no other node in the network is affected. At step 804 and the status update is transmitted throughout the blockchain (step 806). Thereafter, at step 808, the node can disconnect from the network 100.

If the node is assigned as a backup node for a stream(s), but is not currently streaming, the process 800 will advance from step 802 to step 810 where the node 106 informs (e.g., through Whisper), the nodes that it is a backup for, to elect a new backup node to replace it. The new backup node election will be run by the node that the departing node backing up. That node then will broadcast the information about the new backup node to the other nodes. Each of these nodes will check the correctness of the election process used. Thereafter, the departing node will advance to step 804 and run a smart contract to update its unavailable status on the blockchain (step 806) and then leave the network (step 808). In this way, the node will not be chosen again during subsequent elections If the departing node is delivering a stream(s) and it is assigned as backup for others, the node will follow the previous procedure with the nodes it is a backup for (e.g., steps 802-810). Those nodes will take care of running an election for the new backup. For the existing live streaming connections, the node will contact all of the neighboring nodes that are receiving streaming from the departing node (downward links) and prompt them to use their backup node for the stream (step 812). Also at step 812, the node will inform the broadcasters of the streams that it is delivering, that certain connections will no longer exist. Once all the nodes are moved to backup node, they will inform the departing node and it will disconnect from the network (step 808). If one of the nodes does not reply within a certain timeout, the node will be allowed to leave the network anyways without prejudice.

During step 812, the remaining nodes involved in the transitioning of the leaving node will also inform the broadcaster 102 of the streams information they are receiving about the connections that have changed. This redundancy guarantees that both the nodes in the stream and the broadcasters 102 continue having an updated version of all the existing links. Additionally, the nodes that used to be a backup node to a departing node will then elect a new backup node and send information about the elected backups to the other nodes. Not depicted in process 800, if a node leaves the network permanently without allowing its neighbors to switch to the backup node, it can be penalized by the network 100 service provider (e.g., denied access, incentives, etc.) to ensure that the network is maintained by reliable nodes.

Figure 9:
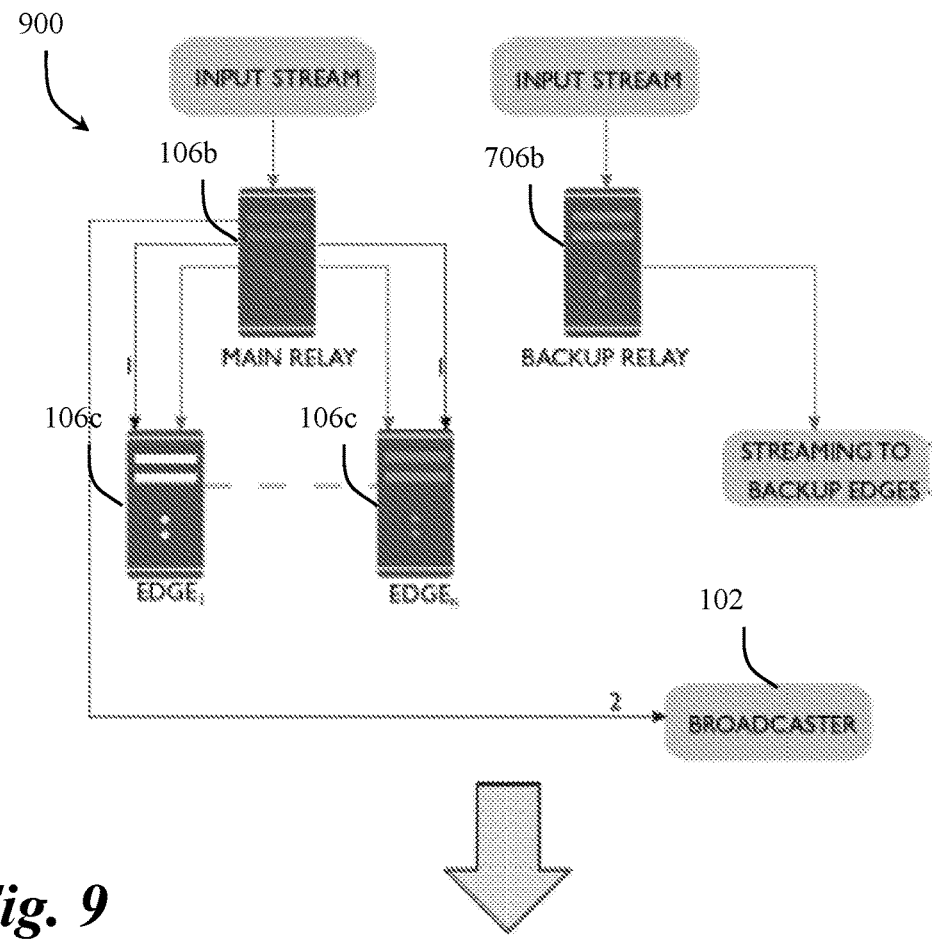
FIG. 9 is an exemplary process for active and backup nodes disconnecting from participation within a decentralized network, in accordance with the present invention.
Figure 9:
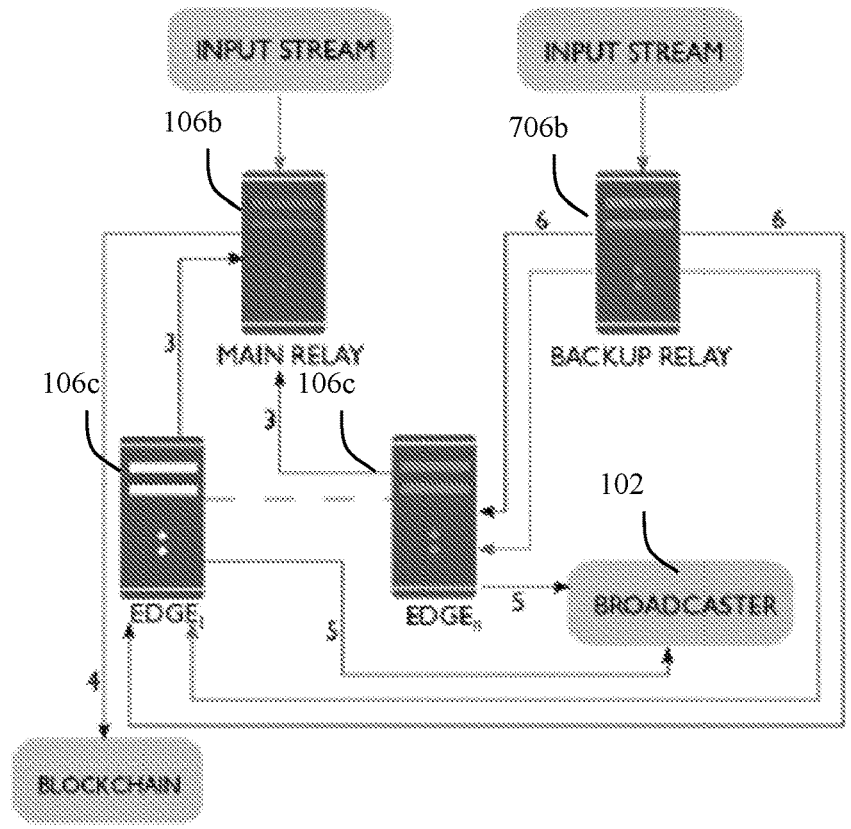

FIG. 9 depicts an exemplary example for the disconnection procedure discussed with respect to FIG. 8. FIG. 9 shows the disconnection procedure 900 with the exemplary example in which a main relay node 106b leaves the network and the edge nodes 106c it is serving connect to the backup relay node 706c to continue delivering video streams. More specifically, on the top section, the edge nodes 106c receive the multimedia from the main relay node 106b while on the bottom the stream has switched to the backup relay nodes 706b. The double arrows represent a multimedia stream being delivered.

For the existing live connections, the relay node 106b will contact all of the neighbors that are receiving from it (e.g., the edge nodes 106c in FIG. 9) and prompt them to use their backup rely node 706b for continuing the stream (step 1). The relay node 106b will also inform the broadcasters 102 of the streams it is delivering, that certain connections will no longer exist (step 2). Once all the edge nodes 106c have connected to the backup relay node 706b, they will inform the original relay node 106b that the connections have been transferred (step 3). The relay node 106b (the one wishing to leave) will then disconnect from the network 100 (step 4). Additionally, If one of the neighboring edge nodes 106c does not reply within a certain timeout, the relay node 106b will be allowed to leave the network 100 anyways. The edge nodes 106b will also inform the broadcaster 102 of the streams they are receiving about the connections that have changed (step 5). Step 5 guarantees that both the edge nodes 106c and the broadcasters 102 continue having an updated version of all the existing links. The relay node 706b (now the active relay node) that used to be a backup relay node 706b will then elect a new backup relay node and send this node's info to the other nodes (e.g., edge nodes 106b) (step 6). As would be appreciated by one skilled in the art, the process 900 depicted in FIG. 9 can be implemented by any different node role (e.g., by origin nodes, relay nodes, edge nodes, proxy nodes, etc.) and their respective neighboring nodes without departing from the scope of the present invention, such that the process 900 is not intended to be limited only to relay nodes.

After all node elections are completed and a connection between the broadcaster 102 and a subscriber 104 is created, the network 100 enables sub 500 ms end to end latency when leveraging WebRTC and related UDP based protocols for the delivery of streams. By using globally distributed decentralized nodes, the system can ensure that those viewing the streams are connected to nodes that are geographically close to them. Additionally, in accordance with an example embodiment, the broadcaster 102 can implement (and the network 100 supports) Multiple Bitrate (MBR) through a transcoder which takes one video stream as input and outputs multiple video streams with different bitrates. The output streams can be injected into the network 100 through the origin node 106a which will route all of the MBR streams through the relay nodes 106b simultaneously. Thereafter, the relay nodes 106b deliver all the output streams to every edge node 106c (or other relay nodes 106b) that they are connected to. As a result, each edge node 106c will have access to the stream at different bitrates. As would be appreciated by one skilled in the art, when backup nodes are implemented, the MBR can be streamed over the backup nodes as well. The edge node 106c will interact with the subscriber 104 client and deliver the stream via an Adaptive Bitrate Streaming (ABR). In particular, the edge node 106c and subscriber 104 will use a RTCP message called Receiver Estimated Maximum Bitrate (REMB) to provide a bandwidth estimation and then, ABR will use the bandwidth estimation to make the corresponding adjustments to video quality. Thus, the edge node 106c will deliver the video with the highest quality given the estimated available bandwidth. Additionally, the stream quality can also be selected based on user preference, price paid, etc.

Figure 10:
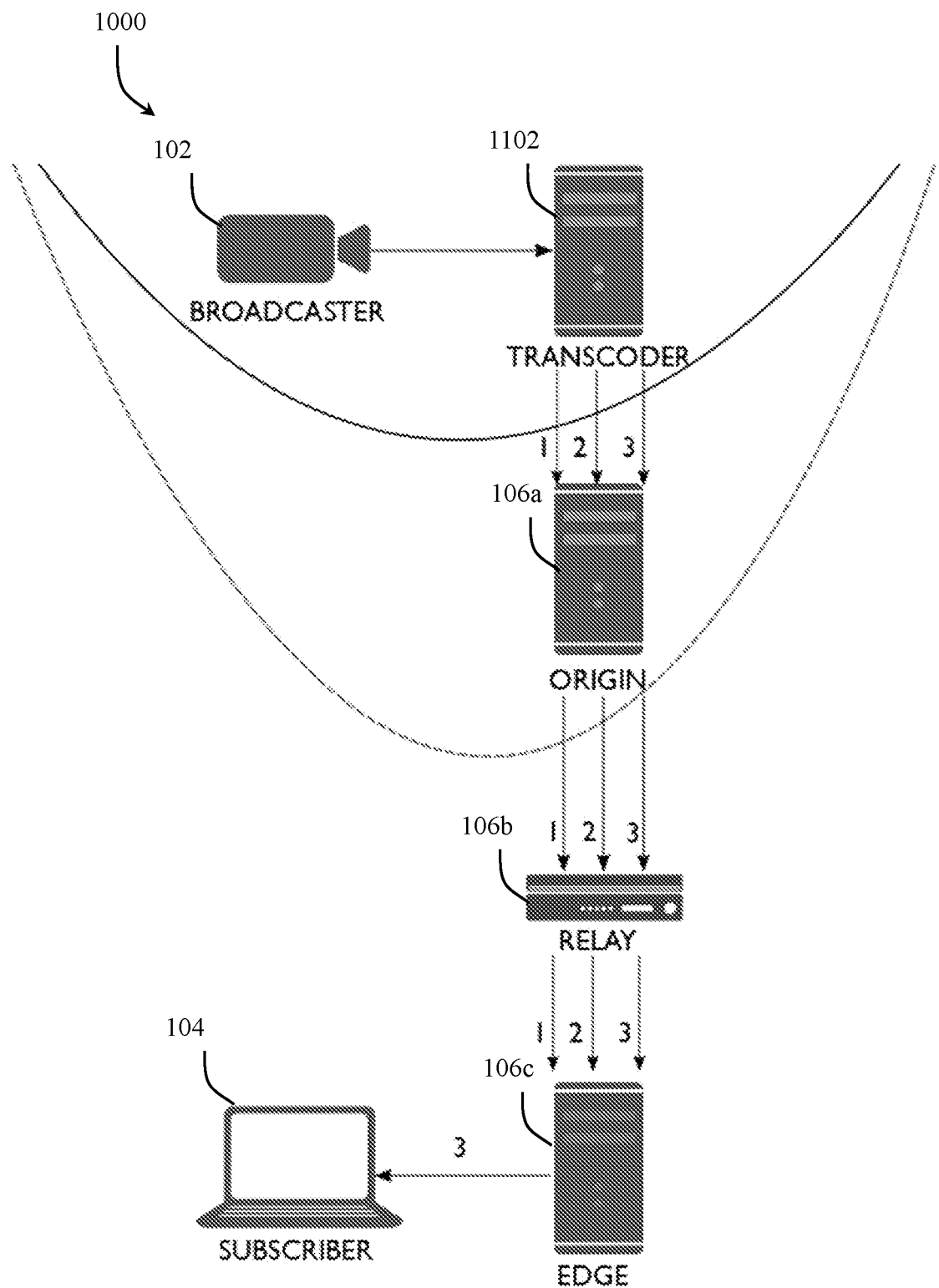
FIG. 10 is an exemplary process for multiple bitrate over a network, in accordance with the present invention.

FIG. 10 depicts an exemplary example of the MBR streaming. In particular, FIG. 10 depicts a network 1000 including a transcoder 1102 with connections and streams between a broadcaster 102 and a single subscriber 104 when using MBR. Each arrow represents a video stream with a specific bitrate. Every internal node, but the edge nodes 106c, receives and delivers all the streams with every bitrate. Similarly, every backup node receives and delivers all the streams with every bitrate except for the backup edge nodes. The solid parabola represents entities always controlled by the broadcaster 102 and the dashed parabola includes entities that the broadcaster 102 can choose to control or not.

In accordance with an example embodiment, when delivering a multimedia stream, the network 100 can implement a double layer of encryption when utilizing WebRTC protocol. The first layer of encryption is provided by the WebRTC specification that forces all traffic to be encrypted using Datagram Transport Layer Security (DTLS). DTLS is a derivation of the SSL protocol and it provides the same security services (integrity, authentication and confidentiality) but under the UDP protocol. DTLS takes care of exchanging keys used to encrypt and decrypt the stream at both peers. Then, the browser can start streaming the video and audio over Secure Real Time Protocol (SRTP). SRTP is the transport protocol that WebRTC uses to send and receive encrypted video and audio. DTLS exchanges the keys that SRTP uses for the encryption. Part of the way SRTP works is that the encryption key used changes periodically, so DTLS needs to update that from time to time and will do so as needed by SRTP. Therefore, the two protocols work closely in tandem to keep the stream secure throughout the session.

However, the end-to-end encryption utilized by WebRTC only guarantees that the two endpoints are the only ones with the unencrypted video stream. In the present invention, which uses WebRTC only between broadcasters 102 and origin nodes 106a and subscribers 104 and edge nodes 106c, implies that the origin nodes 106a and edge nodes 106c (and any relay nodes 106b therebetween) randomly elected from the network 100 would have access to the unencrypted stream. To address this issue, the network 100 implements another encryption layer on top of WebRTC and sends the encrypted data through WebRTC's data channel. This guarantees that only subscribers 104 that acquired a key for the stream can have access to the stream data. In an example embodiment, the new encryption layer can use two keys. The first key can be a symmetric key with which the video stream has been encrypted. Having this key allows a subscriber or any other node to decrypt the stream. The second key can be a DRM key issued by the broadcaster to a subscriber to give access to the content (e.g., to prevent paid streams from being decrypted). The DRM keys can be generated and distributed using the blockchain and functionalities provided by the network 100 or through a centralized system (e.g., a website that the broadcaster 102 owns). The DRM key is not needed to decrypt the video stream but it is needed to verify that a subscriber 104 should have access to a stream. The symmetric key used to encrypt a stream needs to be stored and distributed by the broadcaster 102 of the stream to guarantee secure storage of the key. In one example, the keys can be distributed through a separate authentication server set-up by the broadcaster 102 that will use the public data on the blockchain to determine if a given node 106 should receive the decryption key or not.

An exemplary process for a subscriber 104 to obtain a key includes the subscriber obtaining an edge node 106c (e.g., using the client for the system of the present invention), the subscriber 104 connecting to the authentication server for a specific stream which is specified in the stream's smart contract, and the authentication server using the blockchain to verify if the subscriber 104 should have access to the stream or not (e.g., checks if the user owns a valid DRM key). If the access is granted, the subscriber 104 receives the symmetric key used to decrypt the stream, the subscriber connects to the edge node 106c and starts watching the stream, and the edge node 106c verifies if the subscriber 104 owns a valid DRM key. If the key is valid the subscriber 104 can continue watching, otherwise the stream is interrupted by the edge node 106c.

the data channel for the WebRTC or other similar protocol will be used to deliver the encrypted video. The video then will be decrypted on the subscriber side (e.g., using Media Source Extensions (MSE)). An exemplary process for the encryption and delivery process can include the broadcaster 102 generating a symmetric key to encrypt its video stream, generating a stream of packets with video and audio data, and encrypting the stream with the symmetric key generated and sends it through the WebRTC data channel to an origin node 106a. The origin node 106a reroutes the encrypted packets to the relay node(s) 106b which then reroute to the edge nodes 106c. In accordance with an example embodiment, all communication between the different nodes 106a, 106b, 106c will be implemented by the Secure Real-Time Transport Protocol (SRTP). SRTP is a Real-time Transport Protocol (RTP) profile, intended to provide encryption, message authentication and integrity, and replay attack protection to the RTP data in both unicast and multicast applications. The edge nodes 106c send the encrypted packet to the subscribers through the WebRTC data channel and subscribers 104 decrypt the packets and use MSE to play the video. Implementing this process guarantees that the video is delivered encrypted throughout the network all the way to the subscribers 104 from the broadcaster 102. Thus, the only way to decrypt the video would be to have the symmetric key or to break the encryption which is not feasible. Although WebRTC is utilized as an exemplary example, one of skill in the art would appreciate that any protocols that utilize similar functionality can be implemented within the present invention without departing from the scope of the present invention.

Figure 11:
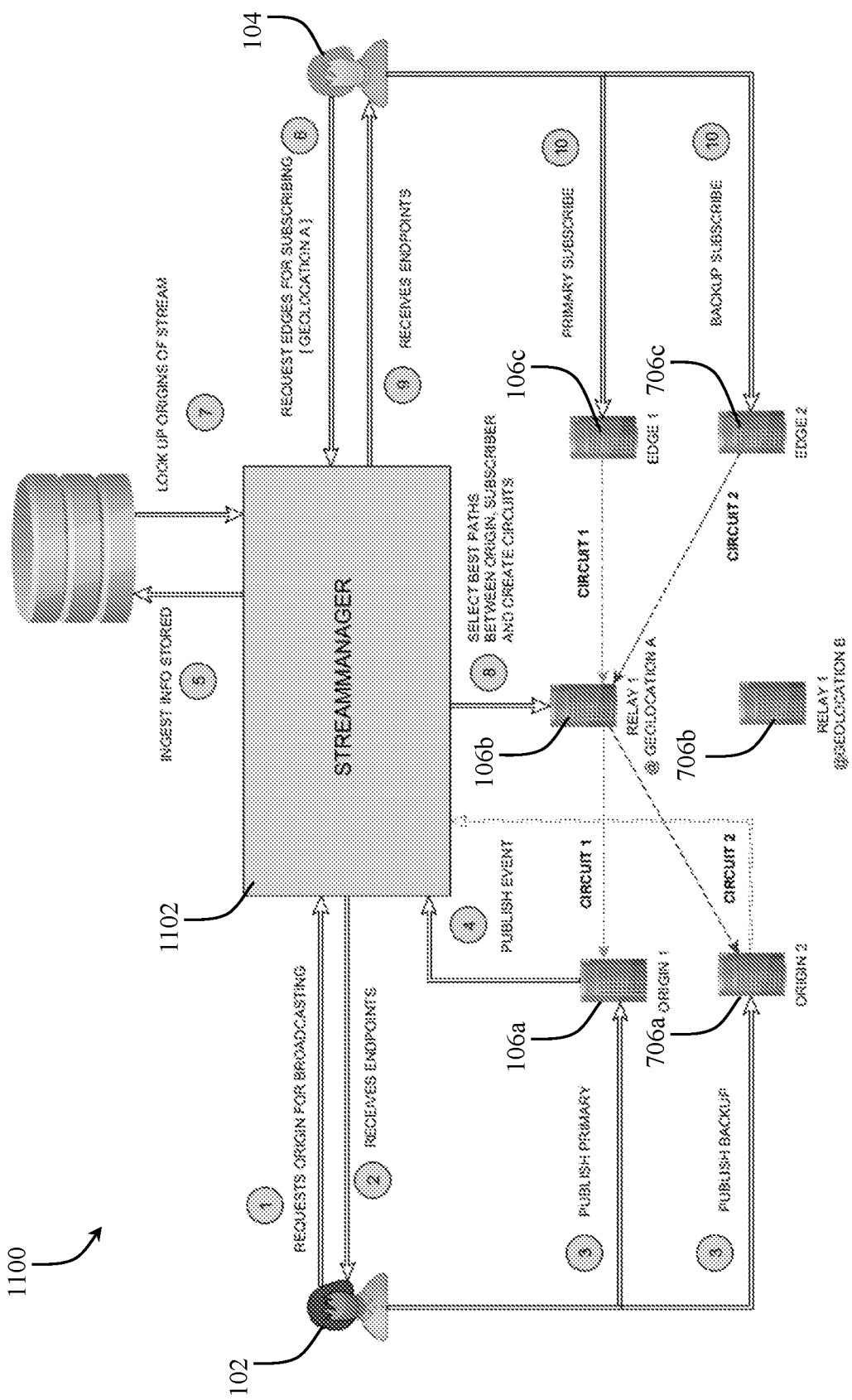
FIG. 11 is a configuration for a centralized streaming network, in accordance with the present invention.

In accordance with an example embodiment, the preset invention can be implemented within a centralized network/system. In a centralized system, a stream manager can be responsible for managing roles of different nodes within the network in place of the blockchain discussed with respect to the decentralized system. FIG. 11 depicts an exemplary system implemented as a centralized network 1100 managed by a stream manager 1102. As shown in FIG. 11, the centralized network 1100 includes components carrying out the same roles (e.g., 102, 104, 106a, 106b, 106c, 706a, 706b, 706c) as discussed with respect to FIGS. 1-10, however in the centralized system, election into and management of those roles is managed by the stream manager 1100 (e.g., instead of a blockchain). Additionally, the components participating in network 1100 can be pre-elected and pre-configured prior to receiving any stream requests or the elections and configurations can happen on the fly when a stream request is received from a broadcaster 102.

The process 1100 in FIG. 11 shows operation of a stream when the components have already been organized (e.g., pre-configured) by the stream manager. At step 1 of process 1100 a broadcaster 102 submits a request to the stream manager 1102 for an origin node 106a for a stream. At step 2 of process 1100 the stream manager provides the endpoints for origin nodes 106a to the broadcaster 102. The endpoints can include information for connecting to one or more origin nodes 106a as well as backup origin node 706a. The exemplary example of FIG. 11 depicts a single main origin node 106a (origin 1) and backup origin node 706c (origin 2). At step 3 of process 1100 the broadcaster 102 publishes the stream to both the main origin node 106a and the backup origin node 706a.

At step 4 of process 1100 the receiving main origin node 106a transmits a publish event to the stream manager 1102 indicating that it has received a stream from an identified broadcaster 102. In response to receiving the publish event, at step 5 of the process 1100, the stream manager 1102 stores ingest information for the published stream. The ingest information can store all received publish events from all of the origin nodes 106a receiving the stream in a table.

At step 6 of process 1100 the stream manager 1102 receives a request for edge nodes 106a from a subscriber 104 for a particular stream. In response to receiving the edge node request, at step 7 of the process 1100, the stream manager 1102 can look up the origins for the requested stream in the data store. At step 8 of process 1100 the stream manager 1102 determines the best paths between the origin nodes 106a and the subscriber 104 to establish a circuit to convey the stream from the origin nodes 106a to the subscriber 104. This determination can be performed utilizing any combination of selection methods and systems. For example, the selection can be based on the geolocation of the participating components.

After the stream manager 1102 determines the best edge node 106c and backup edge node 706c (and any number of intermediary relay nodes 106b, 706b), at step 9 of process 1100, the endpoints for the edge node 106c and backup edge node 706c are transmitted to the subscriber 104. At step 10 of the process 1100 the subscriber 104 can connect to the edge nodes 106c, 706c and subscribe to the stream published by broadcaster 102. The subscription to the stream can include additional steps such as electing from a MBR stream, receiving a DRM key, etc. as discussed in greater detail herein.

FIGS. 12A-12D depict exemplary processes 1202, 1204, 1206. 1208 for implementing the centralized network 1100 of FIG. 11 in an on-the-fly initialization. In particular, FIGS. 12A-12D show the process in which nodes are not connected until a request for an origin node 106a is received from a broadcaster 102. This is in contrast to the implementation depicted in FIG. 11 where the nodes are already pre-elected and connected before receiving a stream request. Regardless of when the nodes are configured, the overall operation of the network uses similar functions.

Figure 12A:
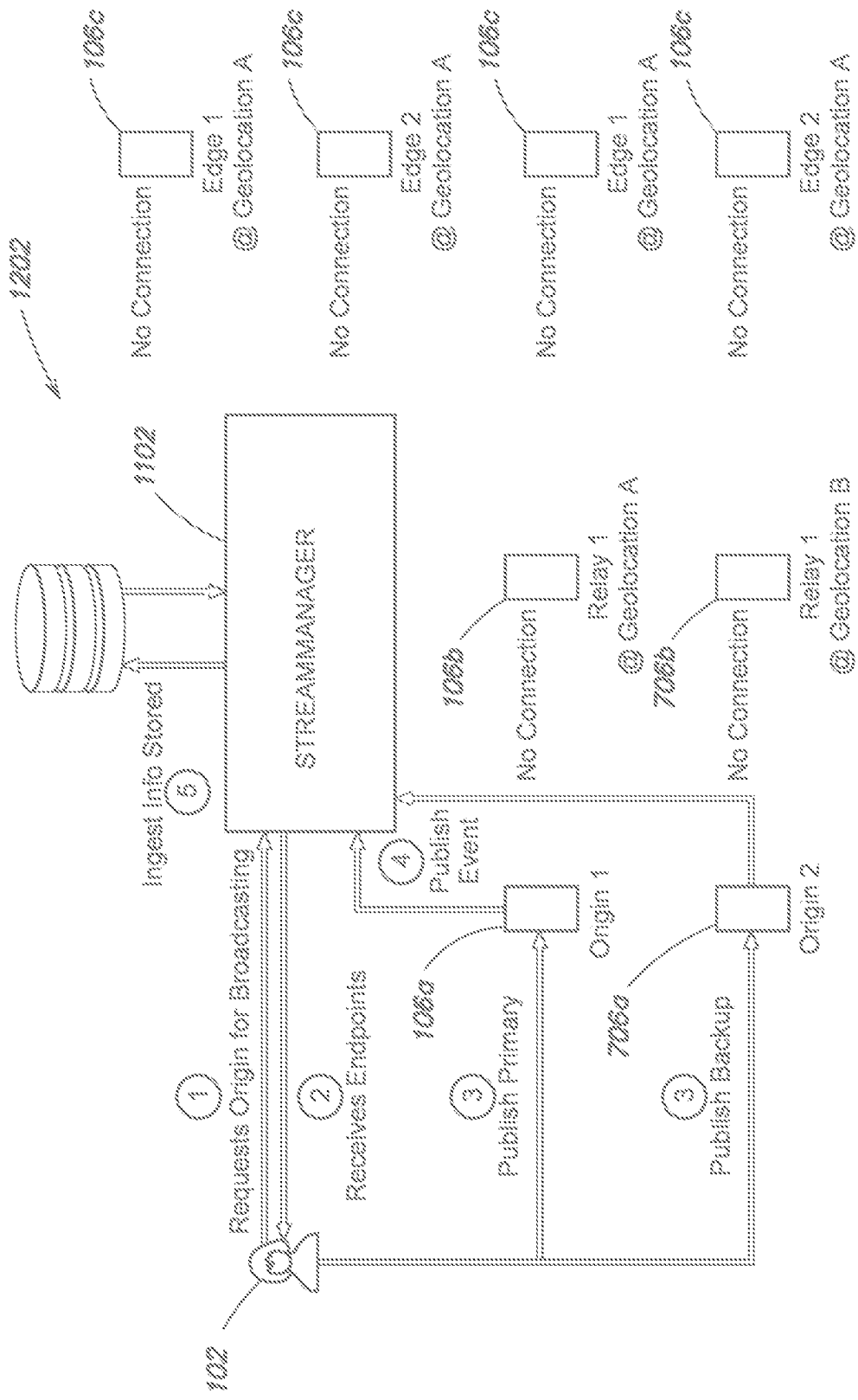
FIGS. 12A, 12B, 12C, and 12D are exemplary processes for implementing a centralized network, in accordance with the present invention.

FIG. 12A depicts the process 1202 in which the broadcaster 102 requests, to the stream manager 1102, to publish a stream on multiple origin nodes 106a with two relay nodes 106b and two edge nodes 106c. At this point, there are no connections between the nodes 106a, 106b, 106c. Steps 1-5 of process 1202, as depicted in FIG. 12A, are the same as steps 1-5 of process 1100 with the exception that the stream manager 1102 is electing the origin nodes 106a, 706a on the fly in response to the broadcaster 102 requesting an origin node.

Figure 12B:
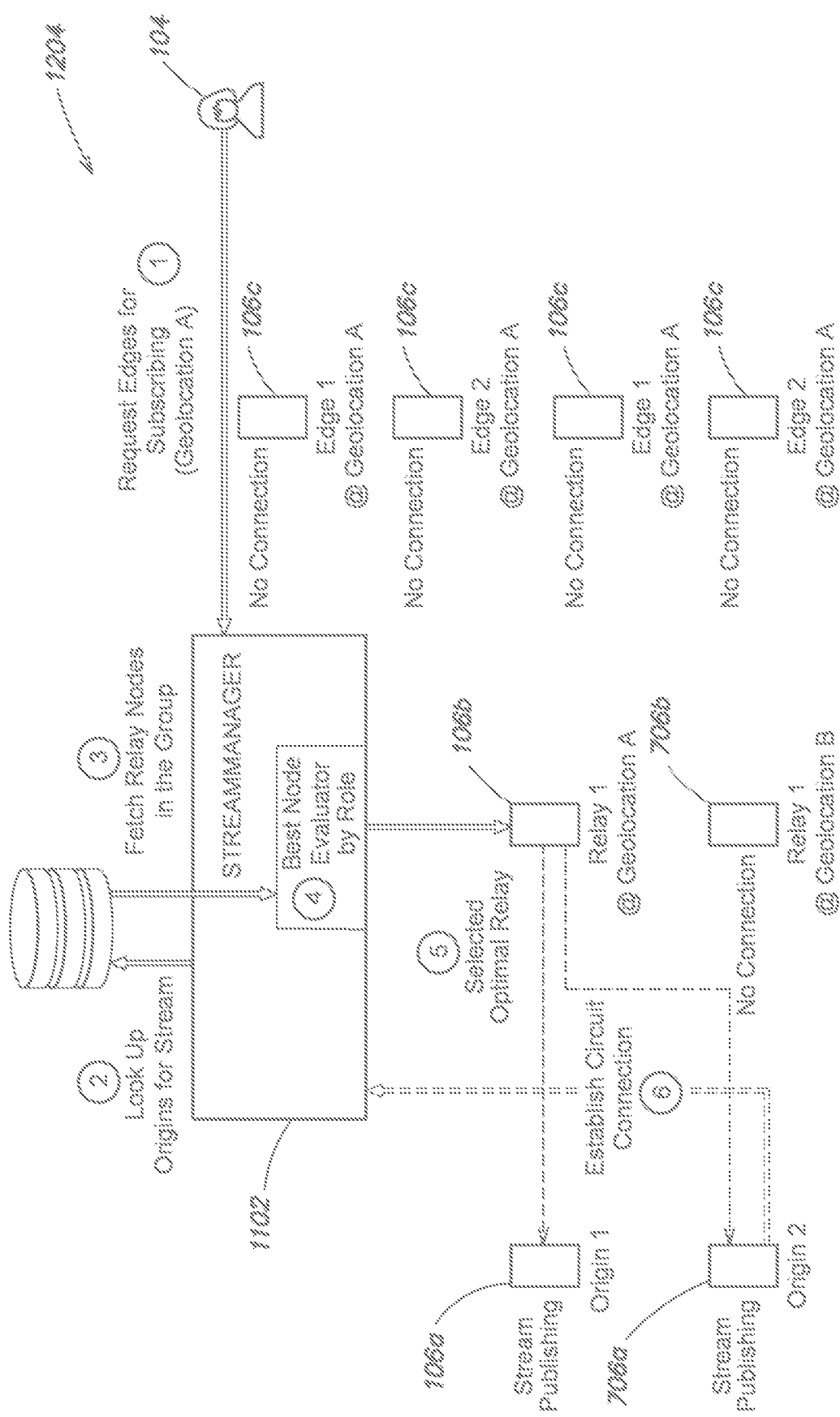

FIG. 12B depicts the process 1204 for establishing connections for relay nodes 106b, 706b in response to an edge node request from a subscriber. At step 1 of the process 1204 the stream manager 1102 receives a request for edge nodes for a stream from a subscriber 104. At step 2 of process 1204 the stream manager 1102 can look the origin nodes 106a for the stream (e.g., from a data store). At step 3 of process 1204 the stream managers 1102 can fetch relay nodes 106b, 706b in the group associated with the origin nodes 106a, 706a. At steps 4 and 5 of the process 1204 the stream manager 1102 evaluates and selects the best relay node(s) 106b, 706b for establishing a circuit between the origin node(s) 106a, 706a and the subscriber 104. In one example, the selection can be the same process utilized in the decentralized system, as discussed in greater detail herein. At step 6 of the process 1204 the stream manager 1102 initiates a connection between the selected origin node(s) 106a, 706a and relay node(s) 106b, 706b.

Figure 12C:
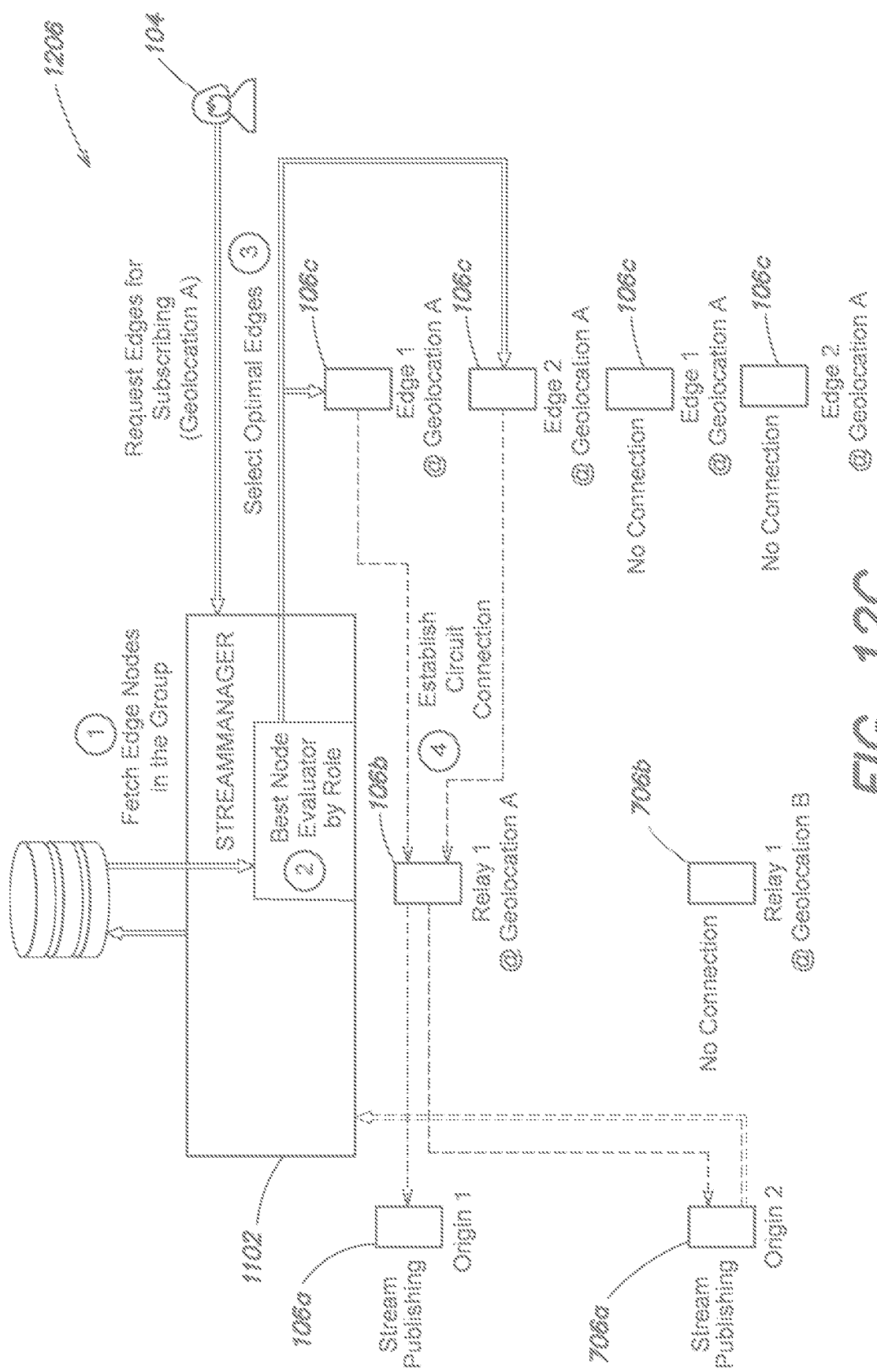

FIG. 12C depicts the process 1206 in which the stream manager 1102 evaluates and selects the best edge node(s) 106c for establishing a circuit path between the relay node(s) 106b and the subscriber 104. At step 1 of the process 1206 the stream manager 1102 fetches available edge nodes 106a from a data store. At steps 2 and 3 of the process 1206 the stream manager 1102 evaluates and selects the best edge node(s) 106c, 706c for establishing a circuit between the origin node(s) 106a, 706a and/or relay nodes 106b, 706b. In one example, the selection can be the same process utilized in the decentralized system, as discussed in greater detail herein. At step 4 of the process 1206 the stream manager 1102 initiates a connection between the selected edge node(s) 106c, 706c and the origin node(s) 106a, 706a and/or relay node(s) 106b, 706b. At the end of process 1206 there is a circuit has been established between the selected origin node(s) 106a and the selected edge node(s) 106c (e.g., via the selected relay node(s) 106b).

Figure 12D:
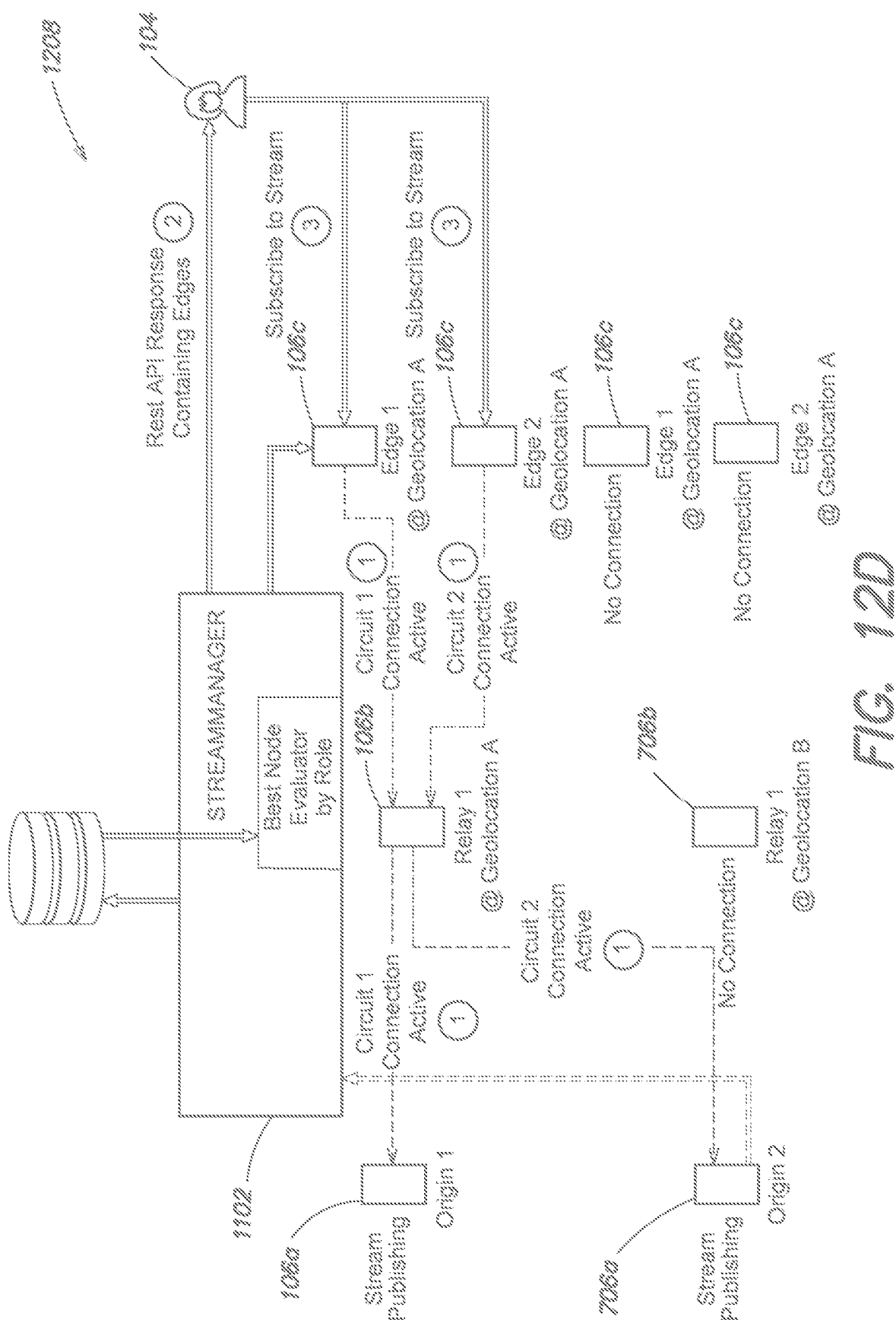

FIG. 12D depicts the process 1208 in which the stream manager 1102 returns the elected edge node(s) 106c to the subscriber 104 and the subscriber 104 can connect to the edge node(s) 106c to activate the stream from the broadcaster 102 (e.g., origin node(s) 106a. The process flow from process 1202 to process 1206 shows how the stream manager 1102 selects nodes, from available nodes, for particular roles within the centralized network 1100 and establishes connections to create two active circuits (as depicted in FIG. 12D) for streaming multimedia from a broadcaster 102 to a subscriber 104. At step 1 of the process 1208 the connections between the origin nodes 106a, 706a, relay nodes 106b, 706b, and edge nodes 106c, 706c are all active. At step 2 of the process 1208 the stream manager 1102 transmits the information for the edge nodes 106c, 706c to the subscriber 104 (e.g., via REST API). At step 3 of the process 1208 the subscriber 104 can connect to the edge nodes 106c, 706c and subscribe to the stream published by broadcaster 102. As would be appreciated by one skilled in the art, the node role election process, backup stream creation/management, MBR, etc. utilized in the decentralized network 100 discussed with respect to FIGS. 1-10 can be similarly implemented within the centralized system discussed with respect to FIGS. 11-12D.

Figure 13:
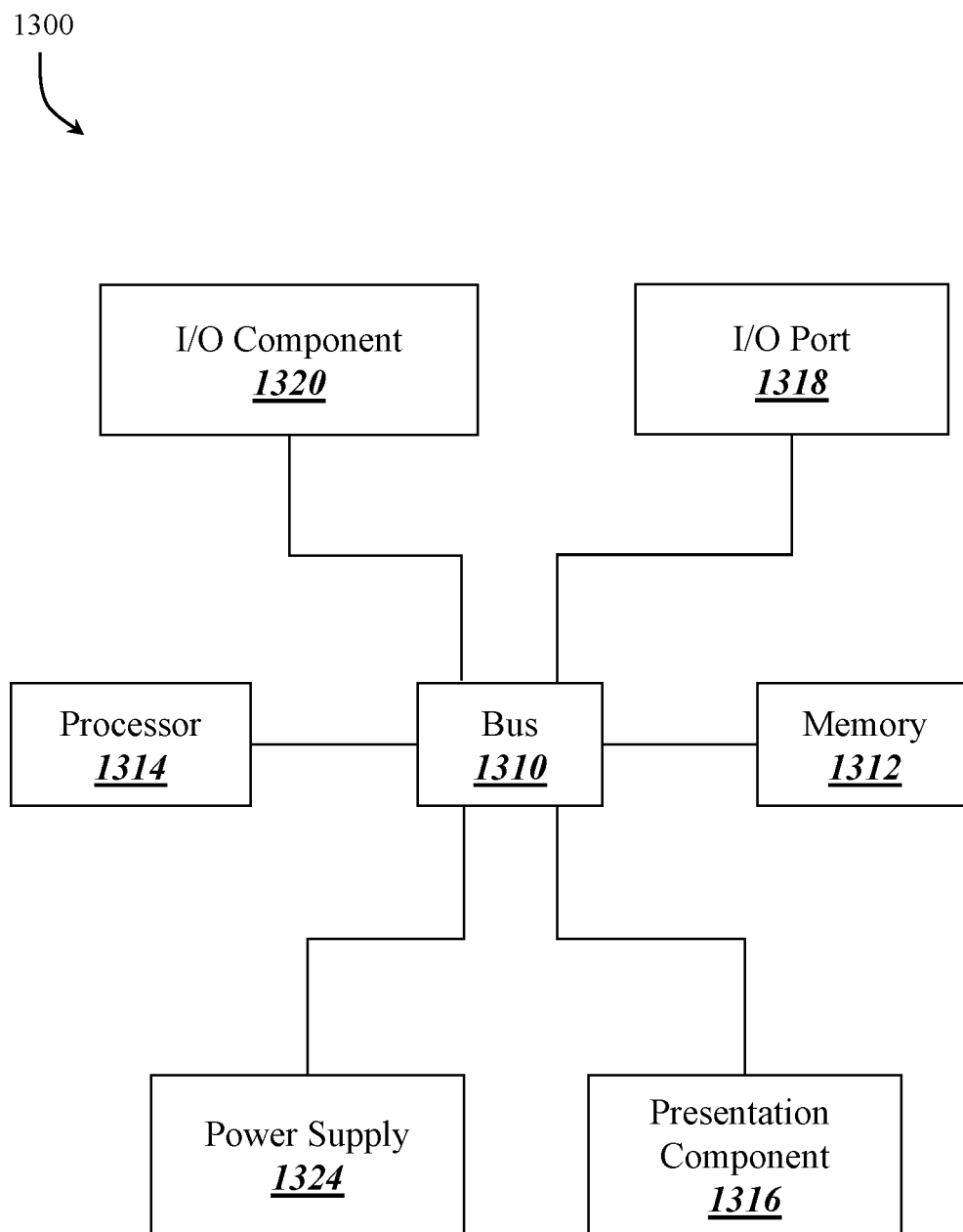
FIG. 13 is an exemplary computer architecture for use within a decentralized network, in accordance with the present invention.

Any suitable computing device can be used to implement the computing devices (e.g., via the broadcaster 102, nodes 106, subscriber 104, stream manager 1102, etc.) and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1300 is 13. The computing device 1300 is merely an illustrative example of a suitable computing environment and in no way, limits the scope of the present invention. A "computing device," as represented by FIG. 13, can depicted in FIG. include a "workstation," a "server," a "laptop," a "desktop," a "hand-held device," a "mobile device," a "tablet computer," or other computing devices, as would be understood by those of skill in the art. Given that the computing device 1300 is depicted for illustrative purposes, embodiments of the present invention may utilize any number of computing devices 1300 in any number of different ways to implement a single embodiment of the present invention. Accordingly, embodiments of the present invention are not limited to a single computing device 1300, as would be appreciated by one with skill in the art, nor are they limited to a single type of implementation or configuration of the example computing device 1300.

The computing device 1300 can include a bus 1310 that can be coupled to one or more of the following illustrative components, directly or indirectly: a memory 1312, one or more processors 314, one or more presentation components 1316, input/output ports 1318, input/output components 1320, and a power supply 1324. One of skill in the art will appreciate that the bus 1310 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 13 is merely illustrative of an exemplary computing device that can be used to implement one or more embodiments of the present invention, and in no way, limits the invention.

The computing device 1300 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices that can be used to encode information and can be accessed by the computing device 1300.

The memory 1312 can include computer-storage media in the form of volatile and/or nonvolatile memory. The memory 1312 may be removable, non-removable, or any combination thereof. Exemplary hardware devices are devices such as hard drives, solid-state memory, optical-disc drives, and the like. The computing device 1300 can include one or more processors that read data from components such as the memory 1312, the various I/O components 1316, etc. Presentation component(s) 1316 present data indications to a user or other device. Exemplary presentation components include a display device, speaker, printing component, vibrating component, etc.

The I/O ports 1318 can enable the computing device 1300 to be logically coupled to other devices, such as I/O components 1320. Some of the I/O components 1320 can be built into the computing device 1300. Examples of such I/O components 1320 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system providing a decentralized network of nodes for live real-time streaming of streaming media data, the system comprising:
 a broadcaster device configured to publish a smart contract on a blockchain including data representing a live stream of streaming media data from a broadcaster;
 a plurality of node devices, each configured to:
  register on the blockchain as an available node in the decentralized network of nodes for participating in delivering live streams to one or more subscriber devices;
  in response to being selected as an edge node device for streaming the live stream from a node device among the plurality of node devices to a subscriber device among the one or more subscriber devices, establish a streaming data connection using a streaming protocol with the subscriber device;
  in response to being selected as an origin node device for streaming the live stream from the broadcaster device to another node device, establish a streaming data connection using the streaming protocol with the broadcaster device;
 wherein, after establishment of a connection path between the broadcaster device and the one or more subscriber devices through the plurality of node devices selected as origin node devices and edge node devices for the live stream:
  the broadcaster device is configured to transmit the live stream over established streaming data connections to origin node devices selected for the live stream,
  each origin node device selected for the live stream is configured to receive the live stream from the broadcaster device and to transmit the live stream over established streaming data connections with one or more respective edge node devices selected for the live stream, and
  each edge node device selected for the live stream for a respective subscriber device and connected to a respective origin node device is configured to receive the live stream from the respective origin node device and to transmit the live stream to the respective subscriber device over the established streaming data connection.

2. The system of claim 1, further comprising at least one relay node device configured to relay the live stream between at least one origin node device and at least one edge node device.

3. The system of claim 2, wherein selecting a node device as an edge node device uses a logistical regression process.

4. The system of claim 3, wherein the logistical regression process comprises determining at least one of a geographical position, a bandwidth score, a packet loss score, or an age of the plurality of node devices and selecting one of the plurality of node devices as an edge node device based on the least one of the geographical position, the bandwidth score, the packet loss score, or the age.

5. The system of claim 4, wherein the determining the geographical position comprises:
 calculating a geographical position of a node device based on the IP address of the node device at a time of joining the decentralized network;
 associating a geographical value based on a geographical region of the geographical position; and calculating a distance between the node device and a target node device based on the geographical value of the node device and a geographical value of the target node device.

6. The system of claim 4, wherein the determining the bandwidth score comprises:
monitoring bandwidth of transactions provided to a node device;
calculating a sum of all the bandwidth of the transactions; and
dividing the sum by a sum of all transactions generates after the node device joined the decentralized network.

7. The system of claim 4, wherein the determining the packet loss score comprises:
calculating a sum of all packet losses reported by neighbor node devices for a node device; and
dividing the sum by a total number of transactions performed by the node device.

8. The system of claim 4, wherein the determining the age comprises an amount of time that has elapsed since a most recent stream was delivered by a node device.

9. The system of claim 1, further comprising at least one proxy node device configured to establish the streaming data connection between at least one edge node device and the subscriber device using a WebRTC protocol including a secure encrypted streaming data connection to the subscriber device and an unencrypted connection to the at least one edge node device to establish the secure encrypted streaming data connection with the at least one edge node device.

10. The system of claim 9, wherein the WebRTC protocol is utilized to implement a double layer encryption comprising a first layer of encryption through the WebRTC protocol using Datagram Transport Layer Security (DTLS) and a second layer of encryption transmitting a Digital Rights Management (DRM) key issued by the broadcaster device.

11. The system of claim 1, further comprising a transcoder configured to provide a Multiple Bitrate (MBR) to create multiple streams with different bitrates through at least one origin node device.

12. The system of claim 9, wherein the WebRTC connection provides real-time end-to-end latency below 500 ms, regardless of a physical location of the broadcaster device and the subscriber device.

13. The system of claim 1, wherein each node device is further configured to, further in response to being selected as the edge node device for the subscriber device, send a message to the broadcaster device indicating that the node device has been selected as the edge node device connected with the subscriber device for the live stream provided by the broadcaster device.

14. The system of claim 13, wherein each node device is further configured to, further in response to being selected as the edge node device for the subscriber device, store relationship information in a local private database of the node device indicating that the node device has been selected as the edge node device connected with the subscriber device for the live stream provided by the broadcaster device.

15. The system of claim 13, wherein the subscriber device is further configured to send a message to the broadcaster device indicating the node device that has been selected as the edge node device for the subscriber device for the live stream provided by the broadcaster device.

16. The system of claim 15, wherein the subscriber device is further configured to store relationship information in a local private database of the subscriber device indicating the node device that has been selected as the edge node device for the subscriber device for the live stream provided by the broadcaster device.

17. The system of claim 15, wherein the broadcaster device is further configured to, after receiving messages from the subscriber device and the node device that has been selected as the edge node device for the subscriber device, update a local database of the broadcaster device with data indicating the connection path between the subscriber device and the edge node device.

18. The system of claim 1, wherein each node device is configured to store, in a local database of the node device, information describing, for each live stream processed by the node device, data indicating a respective role of the node for the live stream and a list of respective neighboring devices for the live stream.

19. The system of claim 18, wherein the broadcaster device is configured to store, in a local database of the broadcaster device, data indicating, for each live stream provided by the broadcaster device, a respective role and identifier of each node device participating in transmitting the live stream.

20. The system of claim 1, wherein the broadcaster device is configured to store, in a local database of the broadcaster device, data indicating, for each live stream provided by the broadcaster device, a respective role and identifier of each node device participating in transmitting the live stream.

21. A system providing a network of nodes for live real-time streaming of a live stream of streaming media data from a broadcaster device to one or more subscriber devices, the system comprising:
a plurality of node devices, each configured to:
register as an available node in the network of nodes for participating in delivering live streams of streaming media data;
in response to being selected as an edge node device for streaming the live stream from a node device among the plurality of node devices to a subscriber device among the one or more subscriber devices, establish a streaming data connection using a streaming protocol with the subscriber device;
in response to being selected as an origin node device for streaming the live stream from the broadcaster device to another node device, establish a streaming data connection using the streaming protocol with the broadcaster device;
wherein, after establishment of a connection path between the broadcaster device and the one or more subscriber devices through the plurality of node devices selected as origin node devices and edge node devices for the live stream,
the broadcaster device is configured to transmit the live stream over established streaming data connections to origin node devices selected for the live stream,
each origin node device selected for the live stream is configured to receive the live stream from the broadcaster device and to transmit the live stream over established streaming data connections with one or more respective edge node devices selected for the live stream;
each edge node device selected for the live stream for a respective subscriber device and connected to a respective origin node device is configured to receive the live stream from the respective origin node device and to transmit the live stream to the respective subscriber device over the established streaming data connection.

22. The system of claim 21, wherein each node device is further configured to, further in response to being selected as the edge node device for the subscriber device, send a message to the broadcaster device indicating that the node device has been selected as the edge node device connected with the subscriber device for the live stream provided by the broadcaster device.

23. The system of claim 22, wherein each node device is further configured to, further in response to being selected as the edge node device for the subscriber device, store relationship information in a local private database of the node device indicating that the node device has been selected as the edge node device connected with the subscriber device for the live stream provided by the broadcaster device.

24. The system of claim 22, wherein the subscriber device is further configured to send a message to the broadcaster device indicating the node device that has been selected as the edge node device for the subscriber device for the live stream provided by the broadcaster device.

25. The system of claim 24, wherein the subscriber device is further configured to store relationship information in a local private database of the subscriber device indicating the node device that has been selected as the edge node device for the subscriber device for the live stream provided by the broadcaster device.

26. The system of claim 24, wherein the broadcaster device is further configured to, after receiving messages from the subscriber device and the node device that has been selected as the edge node device for the subscriber device, update a local database of the broadcaster device with data indicating the connection path between the subscriber device and the edge node device.

27. The system of claim 21, wherein each node device is configured to store, in a local database of the node device, information describing, for each live stream processed by the node device, data indicating a respective role of the node for the live stream and a list of respective neighboring devices for the live stream.

28. The system of claim 27, wherein the broadcaster device is configured to store, in a local database of the broadcaster device, data indicating, for each live stream provided by the broadcaster device, a respective role and identifier of each node device participating in transmitting the live stream.

29. The system of claim 21, wherein the broadcaster device is configured to store, in a local database of the broadcaster device, data indicating, for each live stream provided by the broadcaster device, a respective role and identifier of each node device participating in transmitting the live stream.

* * * * *